United States Patent
Sha et al.

(10) Patent No.: US 8,327,046 B1
(45) Date of Patent: *Dec. 4, 2012

(54) SYSTEM AND METHOD OF VIDEO DECODING USING HYBRID BUFFER

(75) Inventors: Li Sha, San Jose, CA (US); Ching-Han Tsai, San Jose, CA (US); Chengjun Wang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,981

(22) Filed: Feb. 15, 2012

Related U.S. Application Data

(63) Continuation of application No. 12/509,800, filed on Jul. 27, 2009, now Pat. No. 8,127,058.

(60) Provisional application No. 61/084,433, filed on Jul. 29, 2008, provisional application No. 61/085,486, filed on Aug. 1, 2008.

(51) Int. Cl.
*G06F 3/00* (2006.01)

(52) U.S. Cl. ............... 710/53; 710/52; 710/62; 710/74

(58) Field of Classification Search ............... None
See application file for complete search history.

(56) References Cited

U.S. PATENT DOCUMENTS

| | | | |
|---|---|---|---|
| 5,519,701 | A | 5/1996 | Colmant et al. |
| 6,347,344 | B1 | 2/2002 | Baker et al. |
| 6,434,676 | B1 | 8/2002 | Perloff |
| 8,127,058 | B1 | 2/2012 | Sha et al. |
| 2006/0136617 | A1 | 6/2006 | Sasahara |
| 2011/0085553 | A1 | 4/2011 | Siu et al. |

*Primary Examiner* — Chun-Kuan Lee
*Assistant Examiner* — Dayton Lewis-Taylor

(57) ABSTRACT

In one embodiment the present invention includes an apparatus having a random access memory, a first interface, and a second interface. The first interface is coupled between the random access memory and a plurality of storage devices, and operates in a first in first out (FIFO) manner. The second interface is coupled between the random access memory and a processor, and operates in a random access manner. As a result, the processor is not required to be in the loop when data is being transferred between the random access memory and the storage devices.

20 Claims, 13 Drawing Sheets

SYSTEM AND METHOD OF VIDEO DECODING USING HYBRID BUFFER

CROSS REFERENCE TO RELATED APPLICATIONS

The present application is a continuation of U.S. patent application Ser. No. 12/509,800 for "System and Method of Video Decoding Using Hybrid Buffer" filed Jul. 27, 2009, which claims priority to U.S. Provisional Application No. 61/084,433 for "Bus Gatekeeper for an IP to Guarantee the Whole Chip Stability when the Host Software Tries to Reset this IP" filed Jul. 29, 2008, and to U.S. Provisional Application No. 61/085,486 for "Auto-Programming Channel for an IP via DMA Engine" filed Aug. 1, 2008, the contents of which are all incorporated herein by reference in their entirety.

BACKGROUND

The present invention relates to video processing, and in particular, to video decoding using a hybrid buffer.

Unless otherwise indicated herein, the approaches described in this section are not prior art to the claims in this application and are not admitted to be prior art by inclusion in this section.

Video processing may be bandwidth intensive, computationally intensive and storage intensive. The bandwidth requirements are increasing as higher quality video is becoming available via broadcast, download, or from storage media. The computation requirements are increasing as compression is used (to reduce the bandwidth) and as an increasing number of processing formats are developed. The storage requirements are increasing along with the quality of the video, since display devices are accessing more data from the video processors.

For example, in many devices, the processor must remain in the loop when devices are transferring data either to the processor or to the memory.

As another example, in many devices, the processor must spend time to program various configuration registers before data processing can begin, which potentially wastes time.

As a further example, in many devices, the processor must program various configuration registers over a relatively slow bus, which potentially wastes time.

As a still further example, in many devices, a bus can enter an invalid state due to incomplete transactions during a reset operation.

Thus, there is a need for improved systems for video processing.

SUMMARY

Embodiments of the present invention improve systems for video processing. In one embodiment the present invention includes an apparatus having a random access memory, a first interface, and a second interface. The first interface is coupled between the random access memory and a plurality of storage devices, and operates in a first in first out (FIFO) manner. The second interface is coupled between the random access memory and a processor, and operates in a random access manner. As a result, the processor is not required to be in the loop when data is being transferred between the random access memory and the storage devices. (Such operation may be contrasted with the operation of other devices, which require the processor to remain in the loop.)

According to an embodiment, the random access memory includes a static random access memory configured as a data tightly coupled memory.

According to an embodiment, the apparatus further includes a FIFO controller, and the random access memory implements a number of FIFOs.

According to an embodiment, the apparatus further includes an arbiter circuit between a number of FIFOs and the random access memory.

According to an embodiment, the apparatus further includes a bus interface unit interface. The bus interface unit may operate, in a random access manner, between the random access memory and a bus interface unit module. A number of FIFOs in the random access memory are configurable by the bus interface unit module.

According to an embodiment, a method is provided for operating a memory in a processing system. The memory includes a first interface and a second interface. The method includes configuring a number of FIFOs (first in first out) in the memory. The method further includes operating, in a FIFO manner, the first interface between the memory and a number of storage devices. The method further includes operating, in a random access manner, the second interface between the memory and a processor.

According to an embodiment, the method further includes reading data from one of the storage devices in a FIFO manner and providing the data to a first FIFO. The method further includes reading the data in a random access manner from the first FIFO and providing the data to the processor.

According to an embodiment, the method further includes receiving data from the processor in a random access manner, and storing the data in a first FIFO. The method further includes writing the data from the first FIFO to one of the storage devices in a FIFO manner.

According to an embodiment, a system is provided for processing data. The system includes a first bus, a second bus, a central processing unit, a dynamic random access memory, a direct memory access circuit coupled to the dynamic random access memory via the first bus, and a data stream processor. The data stream processor may be coupled to the central processing unit via the second bus and coupled to the direct memory access circuit. The data stream processor may include a hybrid buffer operation circuit. The hybrid buffer operation circuit may include a static random access memory, a first interface, and a second interface that operate in a manner similar to that described above.

The following detailed description and accompanying drawings provide a better understanding of the nature and advantages of the present invention.

DETAILED DESCRIPTION

Described herein are techniques for video processing. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

This disclosure is organized as follows. First, a general description of the overall system is provided, in order to provide context and details common to other aspects of the system. Second, the hybrid buffer operation (HBO) aspect is described. Third, the HBO FIFO (first in first out) aspect is described. Fourth, the DMA (direct memory access) prefetch aspect is described. Finally, the bus gatekeeper aspect is described.

General System Description

Figure 1:
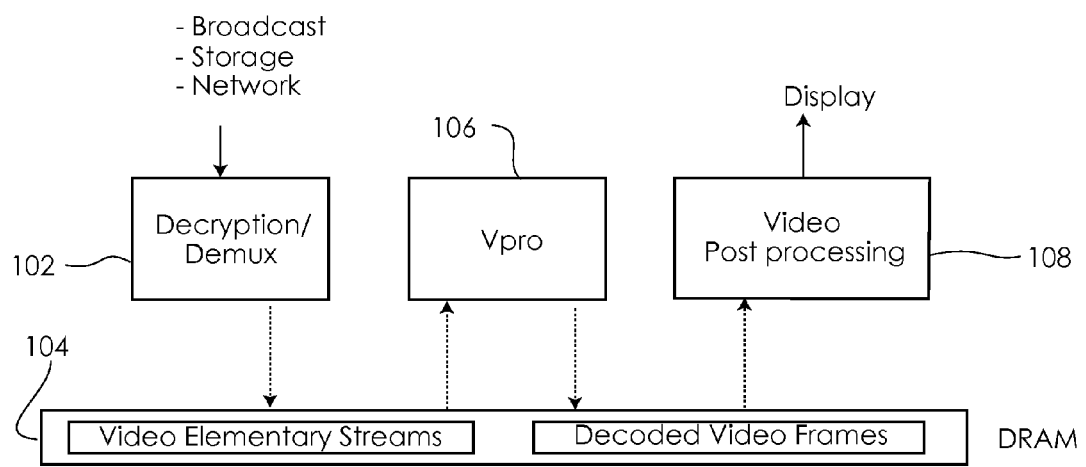
FIG. 1 is a block diagram of a video processing system according to one embodiment of the present invention.

FIG. 1 is a block diagram of a video processing system 100 according to an embodiment of the present invention. The video processing system 100 includes a decryption and demultiplexing circuit 102, a dynamic random access memory (DRAM) 104, a video processor 106 (also referred to as the vPro processor 106 or vPro 106), and a post processing circuit 108.

The decryption and demultiplexing circuit 102 receives video data from a variety of sources, including via broadcast (e.g., terrestrial antenna, satellite, etc.), storage devices (e.g., disk drive, memory, digital video disc, etc.), and network connection (e.g., the Internet, a local area network, etc.). The decryption and demultiplexing circuit 102 performs decryption and demultiplexing on the video data and generates video elementary streams to the DRAM 104. According to an embodiment, the decryption and demultiplexing circuit 102 performs one or more of decryption, demultiplexing, or both.

The DRAM 104 receives the video elementary streams from the decryption and demultiplexing circuit 102 and stores the data. The DRAM 104 provides the video elementary streams (VESs) to the video processor 106. According to an embodiment, the DRAM 104 may be another type of memory or storage circuit.

The video processor 106 receives the video elementary streams, processes the data as further detailed below, and provides decoded video frames to the DRAM 104. The DRAM 104 stores the decoded video frames and provides the decoded video frames to the post processing circuit 108.

According to an embodiment, the video processor 106 decodes the compressed video elementary streams to produce the reconstructed video frames (in YUV422 format) for display or further processing. Note that both the input VESs and the output frames may be stored in the DRAM 104; as a result, there may be no direct connection between the video processor 106 and other functional blocks.

According to an embodiment, the video processor 106 supports the following video formats: H.264 MP/HP (main profile/high profile) at L4.1 with ASO (arbitrary slice order); VC-1 AP (video codec 1 advanced profile) at L3, MP@HL (Main Profile at High Level); MPEG-2 MP@HL; DivX HD (high definition) compliant MPEG-4 (motion picture experts group) (ASP [advanced simple profile]) at L4, without GMC [global motion compensation], OBMC [overlapped block motion compensation], RVLC [reversible variable length code]); and AVS (audio video standard).

According to an embodiment, the video processor 106 supports the following formats/features via software: H.264 BP at L3.0 (with data partition, multi-slice group); WMV-7/8 (Windows media viewer); Sony Digital Video & Motion-JPEG (joint picture expert group); MPEG-4 data partition and RVLC; On2; and Real Video.

According to an embodiment, the video processor 106 supports multiple-stream decoding, include the following: ability to switch from any format/resolution to any format/resolution; to decode up to 16 streams simultaneously as long as the total performance requirements are under system limits. According to an embodiment, stream switching may only take place at the frame boundary.

According to an embodiment, the performance of the video processor 106 may be sufficient to decode any of following at 750 MHz: 1 1080p60 any format; or 2 HD (up to 1080i or 1080p30) H.264 (50 Mpbs each) or VC-1; or 4 HD MPEG-2; or 4 720p30 H.264 or VC-1; or 8 SD (NTSC/PAL) any formats. Note that the HD bitstream is defined to be 1080p, 30 fps with average bit rate of 30 Mbps and peak bit rate of 50 Mbps.

The post processing circuit 108 receives the decoded video frames and performs post processing on the decoded video frames. This post processing may include formatting the decoded video frames according to a display protocol for a display device. The post processing circuit provides its output to the display device for display of the video information.

Figure 2:
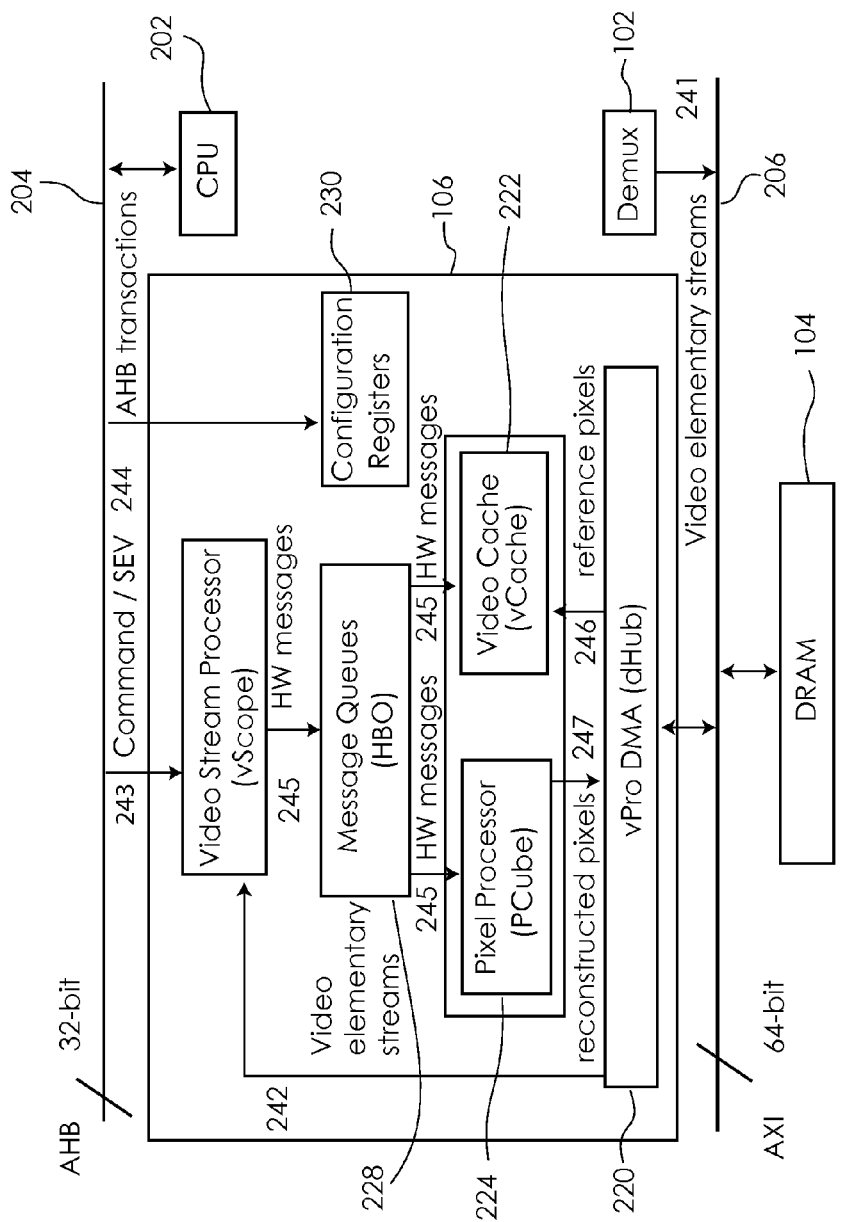
FIG. 2 is a block diagram showing additional details of the video processing system (see FIG. 1) according to an embodiment of the present invention.

FIG. 2 is a block diagram showing additional details of the video processing system 100 (see FIG. 1) according to an embodiment of the present invention. The video processing system 100 further includes a central processing unit (CPU) 202, an advanced high performance bus (AHB) 204, and an advanced eXtensible interface (AXI) bus 206. The video processor 106 (see also FIG. 1) includes a direct memory access (DMA) circuit 220 (also referred to as the dHub 220), a video cache 222 (also referred to as the vCache 222), a pixel processor 224 (also referred to as the pCube 224 or the pCube engine 224), a video stream processor 226 (also referred to as the vScope 226), a message queue circuit 228 (also referred to as the hybrid buffer operation [HBO] module 228), and a configuration register circuit 230. These components of the video processor 106 are described in more detail below.

The CPU 202 provides overall control of the video processing system 100, including programming the configuration registers 230. The CPU 202 may be a video CPU or an audio/video CPU. According to an embodiment, the CPU is an ARM9 CPU from ARM Ltd., Cambridge, United Kingdom. The AHB 204 interfaces between the CPU 202 and the video processor 106. According to an embodiment, the AHB has a width of 32 bits. The AXI 206 interfaces between the decryption and demultiplexing circuit 102 (see also FIG. 1, also referred to as the demux 102), the DRAM 104 (see also FIG. 1), and the video processor 106.

The video processor 106 includes two primary partitions: the stream processing block (e.g., the video stream processor 226) and the pixel processing block (e.g., the video cache 222 and the pixel processor 224), connected through the message queues 228.

The stream processor 226 performs syntax parsing and stream processing. It takes the video elementary stream input via the DMA 220, and is driven either by the commands received via the AHB 204, or by the built in micro controllers (not shown). The stream processor 226 generates messages, which are stored in the HBO module 228, for the pixel processing block.

The pixel processing block contains the pixel processor 224 and the video cache 222 submodules. Driven by the messages stored in the HBO 228, the pixel processing block fetches the reference pixels, performs the pixel-level operations such as transform, interpolation, compensation, deblocking and other filtering, and outputs the reconstructed video frames to the DRAM 104.

A typical operation sequence of the video processor 106 can be summarized as follows. At label 241, the demux 102 extracts the VESs to the buffer inside the DRAM 104. At label 242, the CPU 202 sets up the DMA 220 to start prefetching the VESs. At label 243, the CPU 202 invokes the video stream processor 226 for upper-level stream processing. At label 244, the CPU 202 initializes the rest of the video processor 106, downloads programs, and initializes the video processor 106 for video decoding. At labels 245, the video stream processor 226 performs the lower-level stream processing to generate messages (queued in the HBO 228) for the pixel processing block. At label 246, the video cache 222 fetches the reference pixels for the Pixel processor 224. At label 247, the Pixel processor 224 reconstructs the video frames and outputs them to the DRAM 104.

The hardware of the video processor 106 is designed to be "stateless" where such is practical, in order to reduce the design complexity and streamline the development and verification efforts. Most of the decision making intelligence in the video processor 106 may be shifted to the software, and table-lookup may be used to further simplify the hardware design. In other words, software may play a role in the operation of the video processor 106.

The software of the video processor 106 may be partitioned into multiple levels, each running on a different piece of hardware component. On the top level is the video decoder API (application programming interface), which runs on the CPU 202 and provides high-level functional interfaces such as hardware initialization/shutdown, buffer management, playback control, event handling, etc. This public API interface may be the only thing visible to user-level applications; all the lower-level software and hardware details may be encapsulated and hidden from the user applications.

At the next level down are the different assembly codes running on the local micro-controllers, referred to as F-Blocks (FIGOs). There are three F-Blocks inside the video processor 106: two in the stream processing block video stream processor 226, and one inside the Pixel processor 224. These assembly codes instruct the F-Blocks to generate commands and provide data for the attached hardware components to perform the actual data manipulations. These F-Block assembly codes contain the intelligence for the video processor 106.

At the lowest level are the nanocodes for the SIMD (single instruction multiple data) engine inside the Pixel processor 224. The Pixel processor nanocodes orchestrate the SIMD engine to accomplish various pixel processing tasks, and handle the synchronization between different threads of data operations inside the Pixel processor 224.

TABLE 1 summarizes the software hierarchy of the video processor 106, the associated hardware components, and the primary functions of the software.

TABLE 1

| Name | Hardware Module | Functions |
| --- | --- | --- |
| Video Decoder API | CPU | Hardware initialization/shutdown, buffer management, playback control, event handling |
| Streaming parsing | video stream processor F-Block[1] | Babysit entropy decoder for bit-streaming parsing |
| Syntax processing | video stream processor F-Block[0] | Process syntax elements from video stream processor F-Block[1] to produce hardware messages for pixel processing block |
| Pixel processor message parsing | Pixel processor F-Block | Process messages to generate commands for Pixel processor SIMD engine |
| Pixel processor SIMD nanocode | Pixel processor SIMD | Orchestrate SIMD engine for pixel processing tasks |

In general, information exchange between hardware components of the video processor 106 may be accomplished via one of the following two methods: the message passing method and the shared memory method. In the message passing method, the data and the control information are encapsulated into messages and stored in a FIFO queue that sits between the hardware modules; synchronization is accomplished by the FIFO full/empty status signals. In the shared memory method, the data to be exchanged between hardware modules are stored in a piece of memory that is accessible by both modules; synchronization is accomplished via external means such as semaphores or proprietary handshaking protocols.

Message passing may be applicable when the pattern of data exchange between hardware components is sequential with fixed order. FIFO-based access pattern implies that (1) the flow of the information exchange is one-directional: one of the hardware components is the data producer, while the other one is the consumer, and (2) the order in which the information is generated is the same in which the information is consumed. Shared memory may be used when the data access pattern between hardware components is random by nature, even though it can also be used when the data access pattern is sequential. When the data exchange is FIFO-based, message passing is the more efficient method and thus preferred.

In the video processor 106, there are three hardware execution threads. The first is executed by the video stream processor 226 which parses the video elementary stream and generates the information needed by both the video cache 222 and the Pixel processor 224. The second is executed by the video cache 222, which prefetches the reference pixels needed by the Pixel processor 224 (to perform the motion compensation, for example). The third is executed by the Pixel processor 224, which performs the actual pixel processing using the command and data generated by the video stream processor 226, and the reference pixels provided by the video cache 222.

The video stream processor 226 communicates with the video cache 222 and the Pixel processor 224 via message passing; both the command and the data needed are stored in the message queues inside the HBO 228. According to an embodiment, the HBO 228 provides enough buffer spaces to store messages for processing roughly 16 macroblocks, in order to tolerate the speed differences between the stream processor 226 and the pixel processing blocks (i.e., 222 and 224).

The video cache 222 communicates with the Pixel processor 224 via shared memory, which is located inside the Pixel processor 224. The synchronization between the video cache 222 and the Pixel processor 224 is accomplished by using a common semaphore, for which the video cache 222 is the producer, and the Pixel processor 224 is the consumer. According to an embodiment, the video cache 222 contains a 32 Kbit data buffer to tolerate the differences between the Pixel processor processing speed and DDR (double data rate) bandwidth availability.

According to an embodiment, there are four clock domains inside the video processor 106: the system clock, the AHB clock, the video stream processor clock, and the pixel processor clock. The system clock (pin sysClk) is the clock for the AXI interface 206. The AHB clock (pin hClk) is the clock for the AHB interface 204. The video stream processor clock (pin vScopeClk) is the clock for the majority of the logic inside the video stream processing block 226. The pixel processor clock (pin p3Clk) is the clock for the majority of the logic inside the Pixel processor pixel processor 224.

The four clocks need not be balanced or synchronized with respected to each other. Certain synchronization logic can be saved, though, if the hClk and sysClk are made synchronous to each other.

According to an embodiment, there are two asynchronous resets at the top level for the video processor 106. The first reset, vProGRstn, is the subsystem-level asynchronous reset for the video processor 106; once asserted, the whole video processor 106 will be reset. The second reset, hRstn, is the reset signal for the AHB interface 204. This interface may be synchronized to the hClk domain externally to ensure that all AHB related logic gates are initialized at the same clock cycles. No further synchronization is required with respect to hRstn within the video processor 106.

In addition to the clock-specific asynchronous resets, according to an embodiment there are seven software reset control registers inside the video processor 106, controllable via registers. These reset registers are used to generate software reset signals in order to initialize the logic inside the video processor 106, the submodules, or the various microcontrollers.

According to an embodiment, the video processor 106 contains the following sources of interrupts internally: DMA interrupts, DMA circuit FIFO interrupts, F-Block interrupts, and miscellaneous interrupts. The DMA interrupts relate to the DMA (i.e. DMA circuit 220) channels: The CPU 202 can instruct the DMA engine 220 to issue an interrupt upon completion of any DMA transfer. The DMA circuit FIFO interrupts relate to the DMA circuit FIFOs: Software can configure the DMA circuit 220 such that an interrupt is raised when a FIFO reaches a certain status such as full, empty, almost full, or almost empty. The F-Block interrupts relate to the F-Blocks: Each F-Block can write to a special register to trigger an interrupt to the CPU 202. The miscellaneous interrupts relate to miscellaneous hardware modules, including VLD and pixel processor 224: Hardware modules use these interrupts to notify the CPU 202 that special events, such as the end of decoding a frame or reaching the beginning of a slice, have occurred.

According to an embodiment, each interrupt source has a corresponding status bit inside the DMA circuit BIU (bus interface unit). According to an embodiment, there are three different masks associated with these status registers, in order to support up to 3 host CPUs. Upon receiving the interrupt, the CPU 202 polls the corresponding status registers to find out nature of the event that triggered the interrupt.

According to an embodiment, all interrupt signals are active-high level signals that stay high until cleared by the CPU 202.

Figure 3:
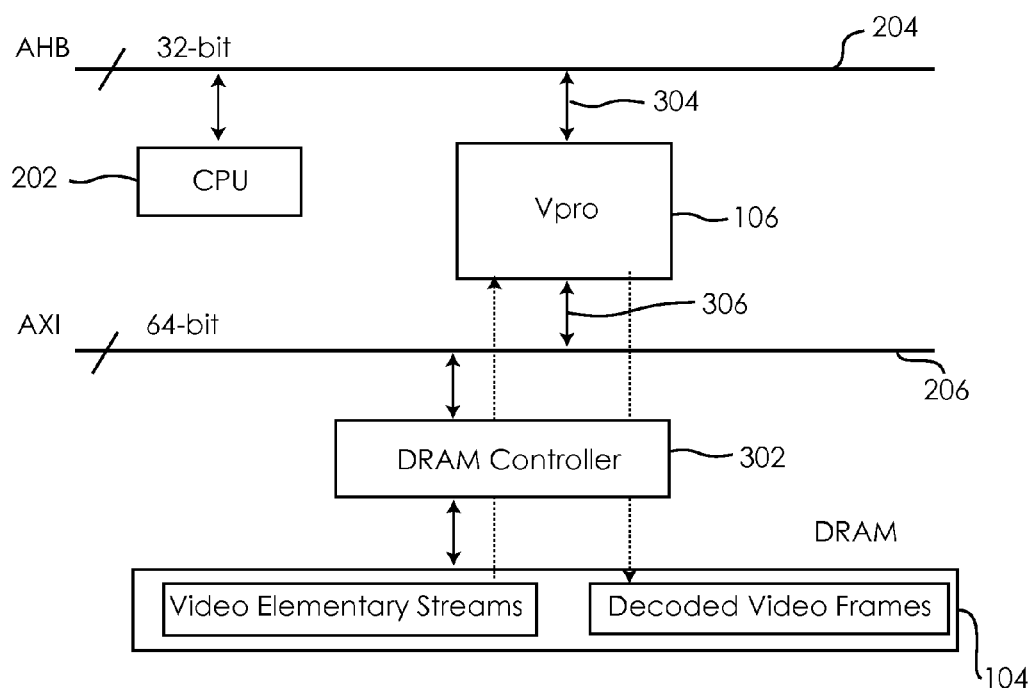
FIG. 3 is a block diagram that further illustrates the interfaces in the video system (see FIG. 1) according to an embodiment of the present invention.

FIG. 3 is a block diagram that further illustrates the interfaces in the video system 100 (see FIG. 1) according to an embodiment of the present invention. A DRAM controller 302 interfaces between the AXI 206 and the DRAM 104. The video processor 106 contains the following two standard interfaces for connection with the rest of the system: an AHB interface 304 and an AXI interface 306. The 32-bit AHB slave interface 304 is for the CPU 202 to program the internal registers or to access the internal SRAM blocks in the video processor 106. The AHB slave interface 304 may be connected to the chip-level AHB bus 204 or AHB crossbar. The 64-bit AXI master interface 306 is for the video processor 106 to transmit video input/output data. The AXI master interface 306 may be connected to the chip-level AXI bus 206, AXI crossbar, or to the DRAM controller 302 directly, depending on the system architecture.

The AHB slave interface 304 is clocked by hClk. According to an embodiment, the AHB slave interface 304 may be either synchronous or asynchronous to the sysClk; if it is made synchronous to hClk, certain synchronization logic can be removed, and the AHB access latency can be improved. This interface is used for programming the video processor 106 configuration registers, or accessing the SRAM blocks inside the video processor 106. It supports a single transaction length for both read and write operations. If an unmapped address location is accessed, or if access timeout occurs, the AHB slave interface 304 will return the AHB error response. According to an embodiment, the access timeout is set to be 256 cycles (in hClk).

The AXI master interface 306 is clocked by sysClk. According to an embodiment, the AXI master interface 306 may issue either the single type of transactions or the burst type of transactions with the burst lengths ranging from two to four. The starting address of a transaction may be aligned with the transaction size; that is, a burst transaction may not cross the 4 KB page boundary. For write transactions, the wValid and aWValid signals can be asserted at the same cycle. For read transactions, back-pressure support by the AXI slave on read data channel is not required. According to an embodiment, out-of-order transactions are not supported; thus the ID for read commands, write commands and write data may be all hard-wired to zero, while the read data ID may be ignored.

According to an embodiment, the bulk of the data transfers for the video processor 106 are 64-bit wide, 4-beat burst transactions on the AXI 206. Furthermore, the burst read transactions may be grouped based on the following assumptions: first, that the size of a DRAM page is multiples of 1 KB, and second, that each DRAM page occupies consecutive range of addresses. If these assumptions are not true, then the data transfer efficiency of the video processor 106 may not be optimal.

Figure 4:
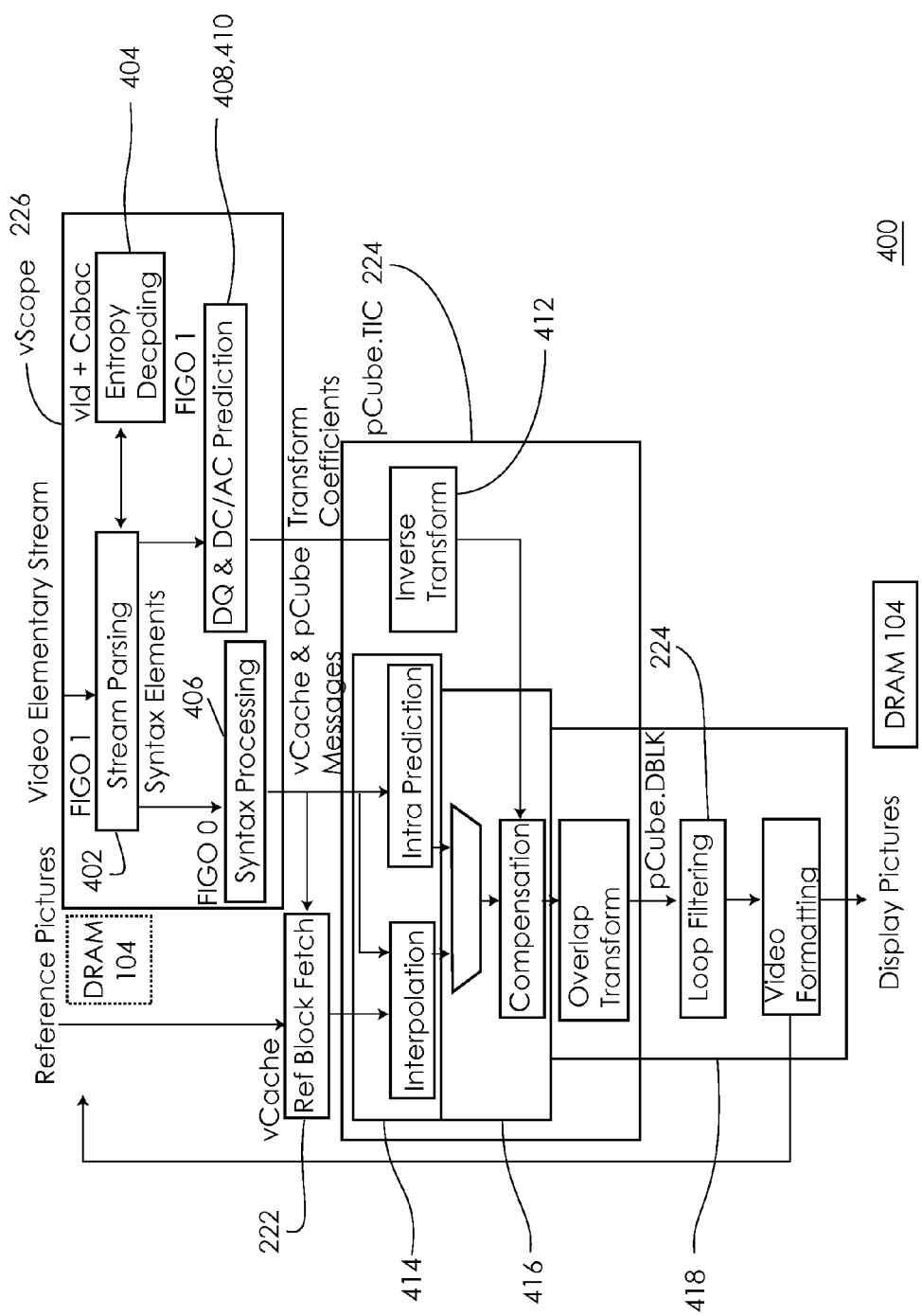
FIG. 4 is a flowchart showing a decoding process according to an embodiment of the present invention.

FIG. 4 is a flowchart showing a decoding process 400 according to an embodiment of the present invention. The names of the corresponding modules or subsystems of the video processor 106 (see FIG. 2) are marked next to the functional blocks.

At label 402, parse the compressed video bitstream to extract syntax elements from it. Entropy decoding using variable-length or arithmetic coding methods is performed at this stage (label 404). At label 406, process the syntax elements to produce relevant information such as coefficients, compression modes, reference picture id, motion vectors and so on. At label 408, dequantize the coefficients. At label 410, perform DC/AC inverse prediction (MPEG4/H.263 ASP only), to obtain the transform coefficients. At label 412, perform inverse transform using DCT or other integer transform methods, to obtain the prediction residuals. At label 414, construct predictors for both intra-predicted (H.264 only) and inter-predicted macroblocks. At label 416, perform compensation (or inverse prediction), by adding the predictor to the prediction residuals. At label 418, filter the reconstructed pixels to reduce artifacts introduced by the lossy compression process (including overlapped transform in VC-1 and loop filtering in VC-1 and H.264).

Figure 5:
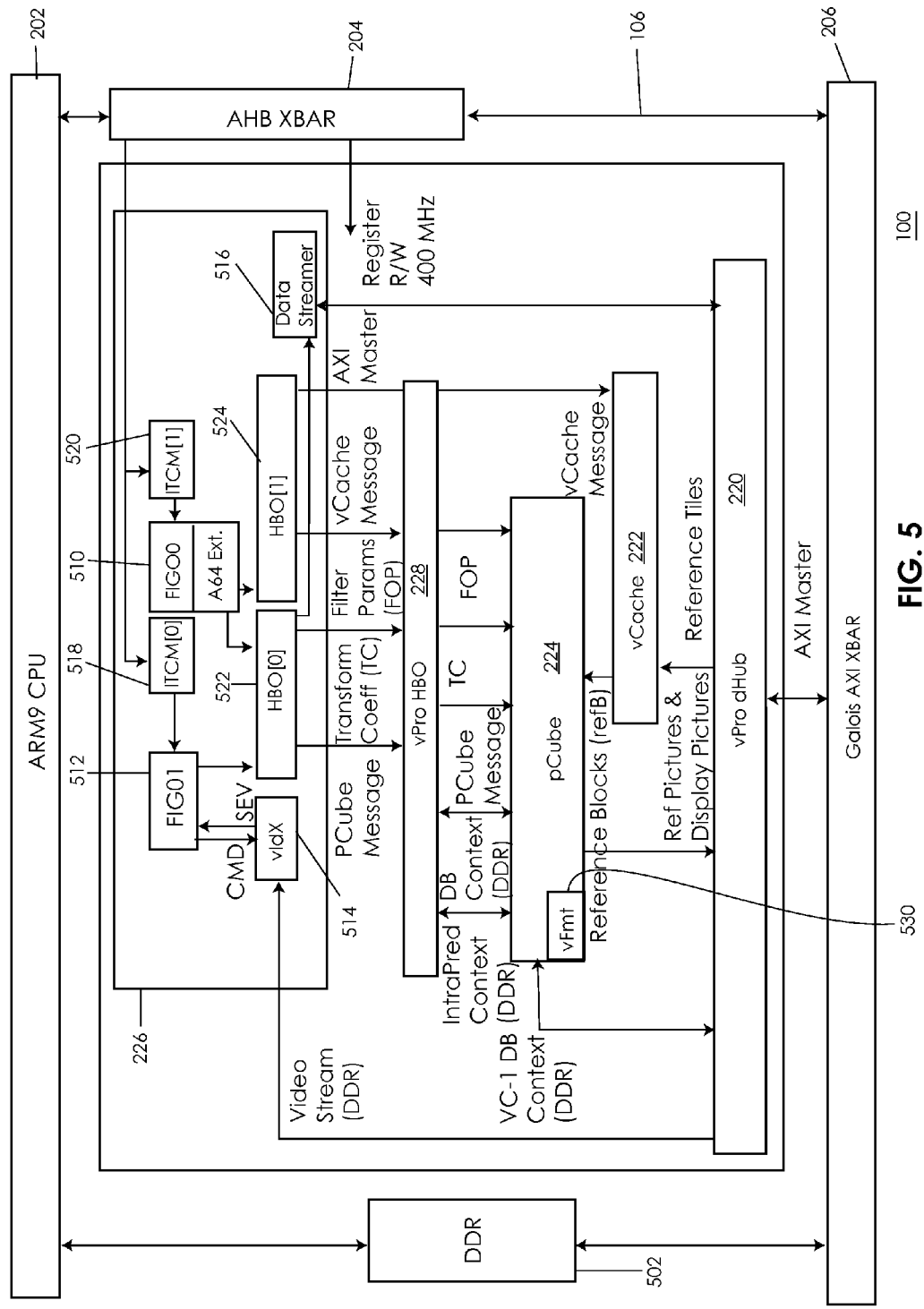
FIG. 5 is a block diagram showing more details of the video system (see FIG. 2) according to an embodiment of the present invention.

FIG. 5 is a block diagram showing more details of the video system 100 (see FIG. 2) according to an embodiment of the present invention. The DDR unit 502 interfaces between the CPU 202 and the AXI crossbar (XBAR) 206. The video stream processor 226 includes a F-Block0 510, a F-Block1 512, an entropy decoder circuit 514 (also referred to as the vldX 514), a data streamer 516, an ITCM[0] circuit 518 (instruction tightly coupled memory), an ITCM[1] circuit 520, an HBO[0] circuit 522, and an HBO[1] circuit 524.

The F-Block0 510 (also referred to as the syntax processor 510) oversees the video decoding process, maintains the decoder context, and generates messages/commands for the various hardware accelerators. Upon power-up, the syntax processor 510 starts running the program stored in the ITCM [0] 518, and exchanges data with the F-Block1 512 and the rest of the video processor 106 through the HBOs 522 and 524.

The F-Block1 512 (also referred to as the stream parser 512) handles the video stream parsing process. Any information needed to drive the state transition of the entropy decoder 514 is generated here. Upon power-up, the stream parser 512 starts running the program stored in the ITCM[1] 520, and exchanges data with the syntax processor 510 and the rest of the video processor 106 through HBOs 522 and 524.

The entropy decoder 514 extracts syntax elements from the compressed video bitstream by using entropy decoding, which includes variable-length decoding (VLD) as well as context-adaptive binary arithmetic decoding.

The data streamer 516 automates data transfer between the DDR 502 and HBOs 522 and 524. The data streamer 516 is typically used to perform context swapping on behave of the F-Blocks 510 and 512.

The HBOs 522 and 524 act as both the local data memory for the F-Block nano machines 510 and 512 inside the video processor 106, as well as the message queues between the F-Blocks 510 and 512 and hardware modules or between hardware modules themselves.

The pixel processor 224 may also be referred to as the pre-deterministic pixel processor 224. It handles such operations as inverse transform, inverse intra prediction, sub-pixel interpolation, motion compensation, and deblocking filtering. The pixel processor 224 includes a video format circuit 530.

The video format circuit 530 (also referred to as the vFmt 530) handles the format conversion of pixel processor 224 outputs to reconstruct pictures both for display and for motion-compensation references. One purpose of the video format module 530 is to perform the data format conversion from the output of pixel processor 224 to the format of the video frame buffers, and writes the resulting data to DRAM 104. Specifically, video format 530 takes the output of pixel processor 224, performs an amount of shuffling/assembly and dynamic range adjustment, calculates the destination address based on the output descriptor, and writes out the data to DRAM 104 (via the AXI crossbar 206). According to an embodiment, the video format 530 supports four different operation modes: bypass, UYVY (for display buffers), chroma and luma (both for reference buffers).

The video cache 222 generates the reference regions to be used for motion compensation based on the values of the motion vectors and the structures of both current and reference pictures. DDR DRAM access by video cache 222 may be optimized to observe the page boundary for better performance.

Semaphores assist the synchronization between producers and consumers of shared resources. For example, video cache 222 and pixel processor 224 use a common semaphore to coordinate the data transfer between them.

The DMA 220 (also referred to as DMA circuit 220) automates the bulk data transfer between memory and hardware modules. For example, entropy decoder 514 fetches the compressed video bitstream from DRAM through DMA 220.

Among the video processor 106 components listed above, stream parser 512, syntax processor 510, HBOs 522 and 524, entropy decoder 514 and data streamer 516 form the stream processing block named video stream processor 226 (also referred to as the video stream co-processing engine 226 or the stream processor 226); pixel processor 224, video format 530, video cache 222, and the HBO 228 form the pixel processing block; and the DMA 220 and semaphores are the facilitators in the video processor 106 subsystem.

The F-Block0 510 and F-Block1 512 are discussed in more detail in U.S. Provisional App. No. 61/085,718 for "FIGO Pre-Jump Architecture" filed Aug. 1, 2008, and U.S. application Ser. No. 12/504,080 for "System and Method of Branch Stack for Microprocessor Pipeline" filed Jul. 16, 2009; the contents of which are incorporated by reference herein.

Figure 6:
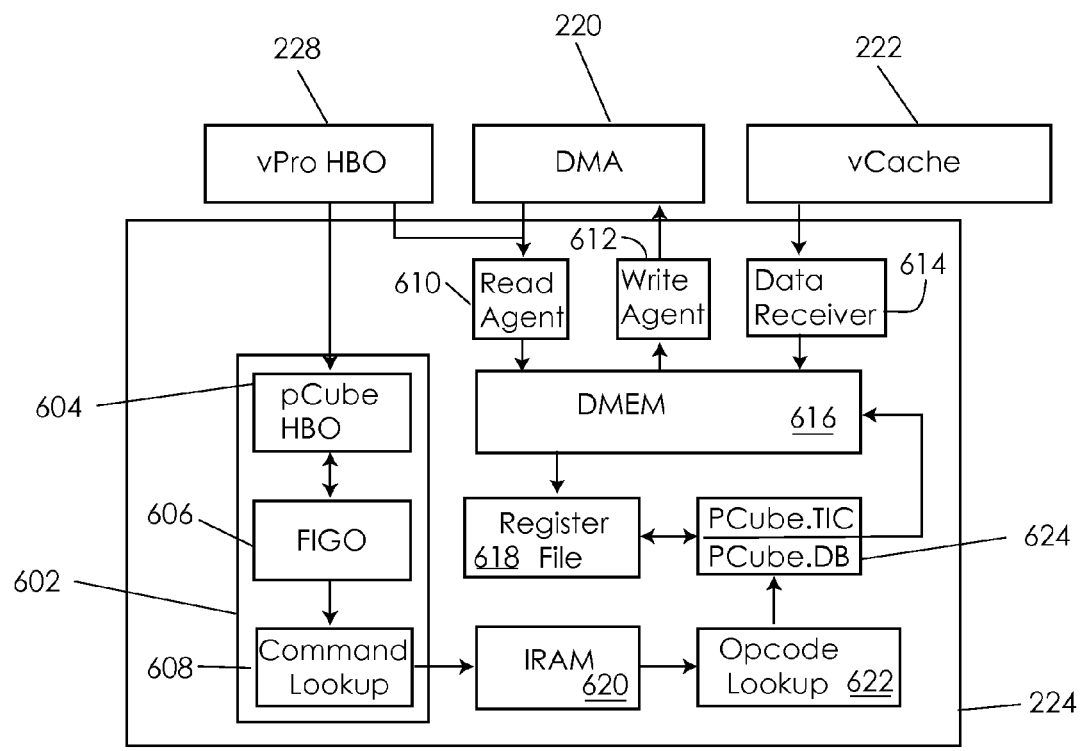
FIG. 6 is a block diagram showing more details of the pixel processor (see FIG. 5) according to an embodiment of the present invention.

FIG. 6 is a block diagram showing more details of the pixel processor (pCube) 224 (see FIG. 5) according to an embodiment of the present invention. The pixel processor 224 includes a controller 602 (which includes a pixel processor HBO 604, a pixel processor F-Block 606 and a command lookup circuit 608), a read agent circuit 610, a write agent circuit 612, a data receiver 614, a data memory (DMEM) 616, a register file 618, an instruction memory (IRAM) 620, an opcode lookup circuit 622, and a data processing pipeline (pCube.TIC and pCube.DB) 624 (also referred to as the pixel processing engine 624).

The pixel processor module 224 is a programmable hardware accelerator optimized for various video codec and image processing tasks, with support for the following types of operations: butterfly styled transforms/inverse transforms, such as DCT (discrete cosine transform); MAC (multiplication/accumulation); FIR (finite impulse response) based linear filtering, for scaling or image processing; and shifting, saturation, and some other basic arithmetic operations.

The pixel processor 224 contains a SIMD (single instruction multiple data) pixel processing engine 624 that can operate on multiple pixels (or a pixel vector) simultaneously, and provides a mechanism for adding hardware extensions to further expand its functionality. According to an embodiment, pixel processor 224 is responsible for performing the following tasks: inverse transform; interpolation; compensation (both intra and inter); and loop filtering. In some sense, the pixel processor 244 can be considered as a specialized DSP (digital signal processing) engine for video compression/decompression.

The pixel processor 224 may be unlike traditional hardware implementations of the MPEG codec, which typically use dedicated hardware modules for each of the above tasks and connect them to operate in a pipelined fashion. Traditional video codec architecture often results in hardware over-design, because due to the nature of the video application, at any given time only some of the compression tools available are employed, not all of them. For example, in any video frame, only some but not all macroblocks may require sub-pixel interpolation, and some other macroblocks but not all may require intra or inter compensation. As long as not every macroblock requires the same set of operations, certain hardware modules will be sitting idle while other tasks are being performed by other modules. As a result, traditional MPEG codec hardware implementations rarely operate at 100% capacity over a sustained period of time.

On the contrary, the pixel processor 224 continuously works on a given macroblock for all the operations required until the decoding is finished, before it moves on to the next macroblock. By reusing the same hardware (i.e. the pixel processing engine 624 in the pixel processor 224) for all the tasks in a serialized fashion, the hardware may operate at (or near or towards) 100% capacity at all times, eliminating the need for hardware over-design due to the speed mismatch among different computation tasks. In order for this architecture to provide enough throughput to satisfy the computation requirement of the application, the pixel processing engine 624 inside the pixel processor 224 may operate at a frequency in the GHz range. This is made possible because the pixel processing engine 624 partitions its pipeline into a fine granularity so only a minimal set of operations are performed within each pipeline stage.

The pixel processor controller 602 reads in messages from video processor HBO 228 (originally from video stream processor 226) and processes these messages to generate the commands for the pixel processor engine 224. The messages are received by the pixel processor HBO 604 and operated on by the pixel processor F-Block 606. The command lookup circuit 608 interfaces the pixel processor controller 602 with the IRAM 620 (instruction random access memory).

The read agent circuit 610 reads the input video data via the video processor DMA 220. The write agent circuit writes back output data either through DMA 220 or through the AXI crossbar 206. The data receiver circuit 614 reads the reference blocks from video cache 222. The data memory 616 is used as the local scratch pad for the pixel processing engine 624. The register file 618 provides operands for the pixel processing engine 624. The instruction memory (IRAM) 620 may be pre-loaded with opcodes needed to direct the pixel processing engine 624 on how to perform any given task. The opcode lookup 622 looks up the opcodes provided by the IRAM 620 for that control the operation of the pixel processing engine 624. The pixel processing engine 624 may operate at a higher frequency than the rest of the module.

The pixel processor 224 is driven by messages that are stored in the video processor HBO 228. These messages can either be generated by the video stream processor (stream processing) block 226, or provided by the software through the AHB configuration interface.

Aspect 1: Hybrid Buffer Operation (HBO)

In a video decoding system, many pieces of information need to be shuttled around between different system components in order to carry forward the decoding process. Often times the information exchanges are of the sequential, first-in-first-out (FIFO) nature, rather than random access based. The HBO module according to an embodiment may be used to provide FIFO control logic and buffer space for multiple producer/consumer pairs (including DMA agents) to exchange sequential-access information. In addition, the HBO module according to an embodiment may provide a set of two synchronous, high-priority random-access ports; these two ports allow the HBO module to be used as the local DTCM (data tightly coupled memory) of one or two micro-controllers and to make the data exchanging between the micro-controllers and the hardware devices much simpler and more efficient. According to an embodiment, a multi-bank SRAM configuration and per bank arbitration between agents may be used to increase the bandwidth processing performance. As a result, one feature of having the CPU manage random access memory through a FIFO rather than hardware is as an alternative to shared memory.

According to an embodiment, a video processing system can have one or more HBO modules. For example, for the video processing system 100, note the HBO 228 in the video processor 106 (FIG. 2), the HBOs 522 and 524 in the video stream processor 226 (FIG. 5), and the HBO 604 in the pixel processor 224 (FIG. 6). In general, use of an HBO allows the sharing of a DTCM between hardware devices and a CPU. The following discussion of HBOs may be used to provide the details for one or more of these HBOs.

Referring back to FIG. 5, one function of video stream processor 226 is to process the compressed video stream, extract the syntax elements, and generate the messages for the pixel processing subsystem (i.e., the pixel processor 224 and the video cache 222). The syntax element extraction is handled by the entropy decoder submodule 514; the stream processing and message generation are handled by the software running on the F-Blocks 510 and 512, with the help of various hardware accelerators; and the generated messages are stored in the video stream processor HBOs 522 and 524. Thus, video stream processor 226 can be considered as being driven by the software running on the F-Blocks 510 and 512, and video stream processor 226 is designed to allow efficient access of instructions, input data and output buffer by the two F-Blocks 510 and 512. The video stream processor HBOs 522 and 524 actually serve dual purposes: to store the context of the stream processing software, and to store the generated messages. In case the software context cannot be completely stored in the video stream processor HBOs 522 and 524, the data streamer 516 can be employed to swap the unused context information into/out of DRAM 104. The generated messages are fetched by the pixel processing subsystem, by cascading video stream processor HBOs 522 and 524 with another HBO module outside of video stream processor 226.

The architecture of video stream processor 226 also allows the stream processing software to be running on the external CPU 202 instead of on the video stream processor F-Blocks 510 and 512. In this configuration, the entropy decoder entropy decoder 514 and the various hardware accelerators can be accessed through the interface to the AHB 204. The syntax elements are still extracted by entropy decoder 514, but are returned to the CPU 202 instead. The CPU 202 then processes the syntax elements, generates the messages for the pixel processing subsystem, and writes the messages to the HBO 228 outside of video stream processor 226 directly via the AHB bus 204. In this configuration, F-Blocks 510 and 512, video stream processor HBOs 522 and 524, and data streamer 516 can all be bypassed.

Figure 7:
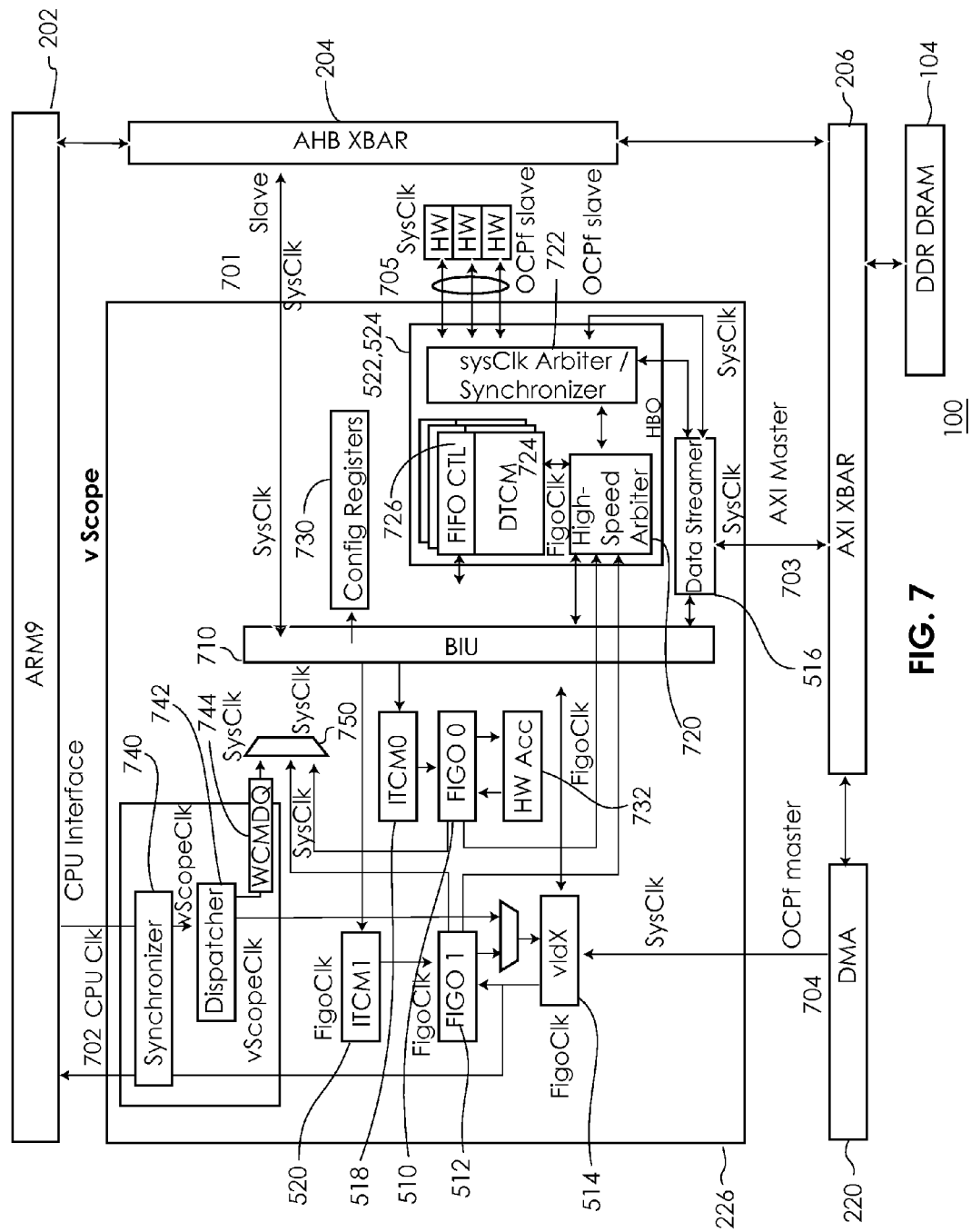
FIG. 7 is a block diagram showing further details of the video system, and more specifically the stream processor video stream processor (see FIG. 5), according to an embodiment of the present invention.

FIG. 7 is a block diagram showing further details of the video system 100, and more specifically the stream processor video stream processor 226 (see FIG. 5), according to an embodiment of the present invention. FIG. 7 also shows which clock signals (FigoClk, SysClk, vScopeClk, etc.) clock which components. The function of the stream processor video stream processor 226 can be summarized as processing the compressed video stream to extract the syntax elements, in order to generate the messages for the pixel processing subsystem (e.g., pixel processor 224, video cache 222, and video format 530). The video stream processor 226 interfaces with other components of the video processing system 100 via a number of interfaces, including a slave interface 701 with the AHB XBAR 204, a CPU interface 702 with the CPU 202, an AXI master interface 703 with the AXI XBAR 206, an OCPf master interface 704 with the DMA 220, and one or more OCPf slave interfaces 705 with various hardware devices or storage devices.

The AHB slave interface 701 interfaces from the AHB crossbar 204 to the video stream processor internal BIU module 710. The AXI master interface 703 is for accessing the DRAM 104 through the AXI crossbar 206. The OCPf master interface 704 reads in compressed video stream from the video processor DMA 220. The OCPf slave interfaces 705 provide FIFO interfaces for the external hardware devices to access the configurable FIFOs (724 and 726) inside the HBO (522 and 524).

The CPU interface 702 may be a high-speed proprietary interface for the CPU 202 to access the video stream processor 226. The CPU interface 702 accepts command and return data for the external master CPU 202. The interface 702 supports 32-bit writes and 64-bit reads. A 16-bit range of address space is allocated to the interface 702, such that when the CPU 202 accesses video stream processor 226, it can transfer not only the data, but also the 16-bit address. This address can be used to select any video stream processor 226 components within the video stream processor 226 16-bit address space.

Specifically, when the CPU 202 writes a data word to the video stream processor 226, the interface decodes the incoming 16-bit address as follows: If the address points to entropy decoder 514, the data is forwarded to entropy decoder 514 as a command for entropy decoding; otherwise the write data, the write address and the write request are all forwarded to the video stream processor local bus through the BIU module 710. This way the video CPU 202 is provided with an efficient interface to write data to the local DTCM in the F-Blocks 510 or 512 or to manipulate the HBO 522 and 524 FIFO status. According to an embodiment, SEV read is supported for reading from the interface 702; if the video CPU 202 wishes to read from the DTCM 724 or the HBO 522 and 524 FIFOs, it should go through the AHB crossbar 204 to access the BIU module 710.

The video CPU 202 may be running at a higher frequency than video stream processor 226; as a result, the interface 702 handles signal synchronization across different clock domains.

Note that the interface 702 is not mandatory in order for video processor 106 to function properly. Its existence helps to improve the performance of hardware/software communications as well as stream-boundary context switching. The interface 702 can be disabled in other embodiments.

The video stream processor subsystem 226 includes the following components (see also FIG. 5): F-Block0 510 (also referred to as the syntax processor 510), F-Block1 512 (also referred to as the stream parser 512), entropy decoder 514, a bus interface unit (BIU) 710, the HBOs 522 and 524, the data streamer 516, configuration registers 730, hardware accelerator (HW acc) 732, synchronizer 740, dispatcher 742, WCMDQ circuit 744, and a multiplexer 750. Descriptions of some of these elements has been provided above with reference to FIG. 5.

The data streamer 516 allows the F-Blocks 510 and 512 to access the external DRAM 104 by acting as a master on the AXI crossbar 204.

The BIU 710 provides the AHB slave interface 701 for access from the global AHB crossbar 204. The BUI 710 interfaces with the configuration registers 730, the ITCM0 518, the entropy decoder 514, the data streamer 516, the HBOs 522 and 524, and other components via the multiplexer 750.

The HBOs 522 and 524 include a high speed arbiter 720, a sysClk arbiter/synchronizer 722, a DTCM 724, and a FIFO controller 726. In general, the HBOs 522 and 524 act as the local DTCM for F-Block0 510 and F-Block1 512, and provide a set of FIFO interfaces for external hardware modules (HW). More specifically, the high speed arbiter 720 interfaces with the BIU 710, the F-Block0 510, the F-Block1 512, and the DTCM 724. The sysClk arbiter/synchronizer 722 interfaces between the data streamer 516, the high speed arbiter 720 and the external HW modules. The DTCM 724 operates as a data tightly coupled memory for the HBOs 522 and 524. The FIFO controller 726 controls the FIFOs implemented in the DTCM 724. Multiple DTCMs 724 and FIFO controllers 726 may operate together to form multiple FIFO structures. Each FIFO structure may be associated with a corresponding one of the external HW modules.

The configuration registers 730 store configuration information for the video stream processor 226. Access to the configuration registers 730 is via the BIU 710. The synchronizer 740 interfaces between the CPU 202 and the video stream processor 226. The dispatcher 742 receives information from the synchronizer 740 and provides it to the entropy decoder 514 and the WCMDQ circuit 744. The WCMDQ circuit 744 interfaces, via the multiplexer 750, to the BIU 710.

Figure 8:
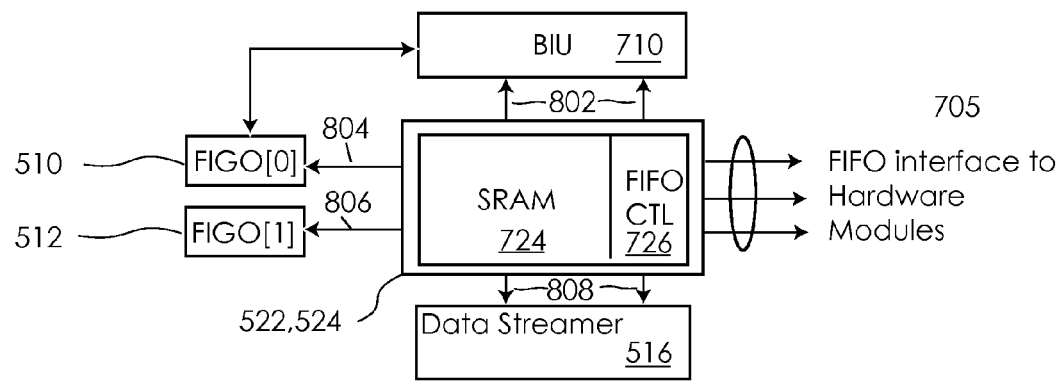
FIG. 8 is a block diagram showing the interaction of the hybrid buffer objects with other components of the video stream processor (see also FIG. 7), according to an embodiment of the present invention.

FIG. 8 is a block diagram showing the interaction of the HBOs 522 and 524 with other components of the video stream processor 226 (see also FIG. 7), according to an embodiment of the present invention. The DTCM 724 (see FIG. 7) is implemented as a static random access memory (SRAM) 724. The SRAM 724 may implement one or more FIFO structures (also referred to as FIFO channels or FIFOs).

The FIFO interface 705 interfaces between the SRAM 724 and assorted hardware modules or other storage devices. The FIFO interface 705 operates in a FIFO manner. For example, the first data stored in a particular FIFO is the first data accessed by the FIFO interface, as controlled by the FIFO controller 726.

The HBOs 522 and 524 also include one or more other interfaces that operate in a random access manner. For example, data may be accessed in the FIFOs according to the address of the data (e.g., not in a FIFO manner) as an addressable memory object. These interfaces include a BIU interface 802 to the BIU 710, a F-Block0 interface 804 to the F-Block[0] 510, a F-Block1 interface 806 to the F-Block[1] 512, and a data streamer interface 808 to the data streamer 516. The BUI 710, F-Blocks 510 and 512, and data streamer 516 operate as processors, e.g., they access data according to the address of the data (not in a FIFO manner).

One feature of the embodiment of FIG. 8 is that the processors may be considered out of the loop when the HBOs 522 and 524 are operating in a FIFO manner to access the hardware modules. Such operation may be contrasted with other systems in which the processor is in the loop when a memory is operating in a FIFO manner.

More generally, the HBOs 522 and 524 provide FIFO control logic 726 and buffer space (e.g., the SRAM 724) for multiple producer/consumer pairs (including DMA agents) to exchange sequential-access information. In addition, the HBOs 522 and 524 provide a set of two synchronous, high-priority random-access ports (e.g., the F-Block0 interface 804 and the F-Block1 interface 806); these ports allow the HBOs 522 and 524 to be treated as a pure memory device, to be used as the DTCM of the F-Block nano machines (e.g., the F-Blocks 510 and 512).

The SRAM 724 may implement a configurable number of FIFOs (up to 16 per memory block according to an embodiment), each one with a configurable size and a configurable base address. Configuration may be done through the BIU module 710.

The FIFO controller 726 may implement a set of status signals (e.g., full/empty, configurable partial full/partial empty) for each FIFO channel. The FIFO address pointers are modifiable through the BIU module 710.

The FIFO interface 705 may implement separate read/write OCPf interfaces for each FIFO, and which may be synchronous or asynchronous.

The SRAM 724 may implement single-port memory blocks for the DTCM, which are accessible through the following ports: two synchronous, high priority random access ports for F-Blocks (one port is assigned the highest priority all the time, the other the second highest priority) (e.g., the interfaces 804 and 806); through the BIU 710 (e.g., the interface 802); and to the AXI interface 703 (see FIG. 7) for random-access data copy to/from the DRAM 104 (see FIG. 7) by way of the data streamer 516 (e.g., the interface 808).

The high speed arbiter 720 (see FIG. 7) may implement fixed priority arbitration for memory access among different access groups, and may implement round-robin arbitration within the same access group.

The buffer space inside the HBOs 522 and 524 may be used for the following purposes: as the local DTCM for the F-Blocks 510 and 512; as mailboxes between the F-Blocks 510 and 512, or between the CPU 202 (see FIG. 7) and the F-Blocks 510 and 512; and as FIFO spaces for data exchange between the F-Blocks 510 and 512, or between the F-Blocks 510 and 510 and the external hardware modules.

The SRAM 724 may be partitioned as the DTCM into multiple memory blocks. If that is the case, then the DTCM access arbitration may be performed separately for each memory block.

According to an embodiment, the HBOs 522 and 524 may be used outside of the video stream processor 226 (see FIG. 7) to act as FIFO buffers between any producer/consumer pair, including hardware to hardware.

Figure 9:
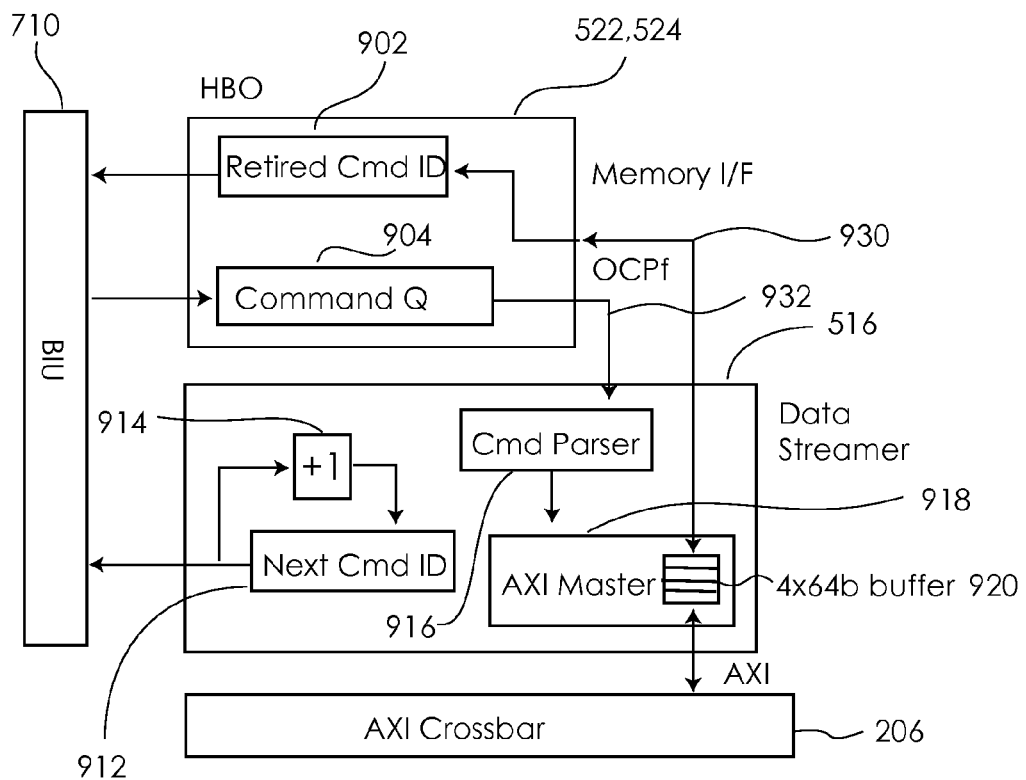
FIG. 9 is a block diagram illustrating more details of the hybrid buffer objects and the data streamer according to an embodiment of the present invention.

FIG. 9 is a block diagram illustrating more details of the HBOs 522 and 524 and the data streamer 516 according to an embodiment of the present invention. (Note that the discussion also references items from FIG. 7.) The HBOs 522 and 524 include a retired command identifier memory (Retired Cmd ID) 902 and a command queue (Command Q) 904. The data streamer 516 includes a next command identifier memory (Next Cmd ID) 912, an incrementer (+1) 914, a command parser (Cmd Parser) 916, and an AXI master circuit (AXI Master) 918. The AXI master circuit includes a buffer 920, which may be 4×64 b according to an embodiment. A memory interface (Memory I/F) 930 and an OCPf interface 932 interface the HBOs 522 and 524 and the data streamer 516.

The data streamer 516 may be considered as a mini DMA engine to allow the F-Block nano machines (e.g., the F-Blocks 510 and 512) to automate data transfer between the local HBO (e.g., the HBOs 522 and 524) and the DRAM 104 (see FIG. 7). The data streamer 516 acts as a master on the video processor AXI crossbar 206. The data streamer 516 operates in the sysClk domain, according to an embodiment.

Inside the HBOs 522 and 524 the command queue 904 stores incoming transfer requests from the F-Blocks 510 and 512 for the data streamer 516; the command queue 904 is accessible by the data streamer 516 through the regular OCPf interface 932. Each transfer command includes following information, according to an embodiment: the HBO address; the DRAM address; the transfer direction (from the HBOs 522 and 524 to the DRAM 104, or the opposite); and the command ID, in order to uniquely identify the commands the number of words to transfer. According to an embodiment, a word is defined to be 4 bytes.

The next command identifier 912 identifies the next command to be sent to the data streamer 516. The incrementer 914 increments the command identifier. The command parser 916 parses the command received from the HBOs 522 and 524. The buffer 920 stores information to be sent or received via the AXI crossbar 206. The AXI master circuit 918 controls the transfer of information to and from the AXI crossbar 206.

After the data transfer is completed for a given command, the corresponding command id is written into a special retired_cmdID location (e.g., the retired command identifier memory 902) inside the HBOs 522 and 524 for software polling. The address of this special location may be configurable. The presence of the command ID, together with an external semaphore with a maximum depth of 1, can be used to facilitate multiple software threads to share the same data streamer 516. TABLE 2 illustrates pseudo code that outlines a typical session of command entry into the data streamer 516 by one of the software threads.

TABLE 2

// acquire semaphore
do { ret_val = check_sem_as_producer( ); } while (ret_val != success);
local_cmdID = DataStreamer.dsNextCmd.val; // read next command ID from register
Compose a new command using local_cmdID;
Write composed command to command queue, and update corresponding FIFO address;
Update semaphore as consumer; // release semaphore
do { read retired_cmdID; } while (retired cmdID < local_cmdID);

As mentioned above, in the video processor 106, many pieces of information need to be shuttled around between different system components in order to carry forward the decoding process. Often times the information exchanges are of the sequential, first-in-first-out (FIFO) nature, rather than random access based. Examples of these information exchanges include the following. A first example is the elementary bit stream, from the demux to the stream parser (such as VLD) (e.g., the F-Block1 512). A second example is the syntax element values, from the stream parser (e.g., the F-Block1 512) to the CPU 202. A third example is messages (or commands), from the CPU 202 to different hardware accelerators. A fourth example is various historical contexts that are maintained and used by firmware (e.g., the CPU 202)

for syntax processing. A fifth example is other miscellaneous data that are passed from one hardware component to the next based on the decoding flow.

As discussed above, the HBOs 522 and 524 provide FIFO control logic and buffer space for multiple producer/consumer pairs (including DMA agents) to exchange sequential-access information. In addition, the HBOs 522 and 524 provide a set of two synchronous, high-priority random-access ports; these two ports allow the HBOs 522 and 524 to be used as the local DTCM of a micro-controller.

According to an embodiment, the HBOs 522 and 524 are configurable to operate in a sync mode and an async mode. In sync mode, all the hardware devices and memory interfaces are at the same clock domain. In async mode, memory interfaces 0 and 1 are at the same clock domain with TCM memory and all other interfaces are at system clock domain.

According to an embodiment, the HBOs 522 and 524 have a configurable number of banks. There may be a configurable number of FIFO channels for each bank. In addition, there may be a configurable memory size for each bank.

According to an embodiment, the HBOs 522 and 524 have per-bank access arbitration. This feature may be implemented by the high speed arbiter 720 (see FIG. 7).

According to an embodiment, the HBOs 522 and 524 have a back door for the micro-controllers to directly update the FIFO channel write/read pointers through a semaphore PUSH/POP interface.

According to an embodiment, the HBOs 522 and 524 have separate read/write OCPf interfaces for each FIFO. These interfaces may be synchronous or asynchronous to TCM memory depending upon the synchronization mode of the HBO 522 and 524.

According to an embodiment, the HBOs 522 and 524 have four random access memory interfaces: two synchronous memory interfaces (e.g., interfaces 804 and 806) for the micro-controllers (e.g., the F-Blocks 510 and 512) to directly access the TCM (e.g., the SRAM 724); one asynchronous/synchronous memory interface (e.g., the interface 808), typically for use by the data streamer 516, and which may support outstanding operations; and one asynchronous/synchronous memory interface (e.g., the interface 802), typically for the BIU 710 memory access use, and which does not support outstanding operations.

According to an embodiment, the HBOs 522 and 524 have the AHB slave interface 701 for FIFO configuration and backdoor access of the common memory space (e.g., the DRAM 104). According to an embodiment, the HBOs 522 and 524 have configurable primary/secondary micro-controller interfaces. According to an embodiment, the HBOs 522 and 524 have fixed priority arbitration for memory access. According to an embodiment, the HBOs 522 and 524 have a single-port register file/SRAM (typically 64 b) for the common memory space.

According to an embodiment, typical usages of the HBOs 522 and 524 include the following. One typical use is to function as the local DTCM (e.g., the DTCM 724) of a micro-controller (e.g., the F-Block0 510), to facilitate data passing between the micro-controller (e.g., the F-Block0 510) to the hardware accelerators, as well as between the DDR DRAM 104 and the micro-controller (e.g., the F-Block0 510) through an external DMA agent. Another typical use is to provide the FIFO channels (e.g., implemented by the DTCM 724) for the DMA agent, thus separating the command processing and address calculation part of the DMA function from the FIFO management part.

Figure 10:
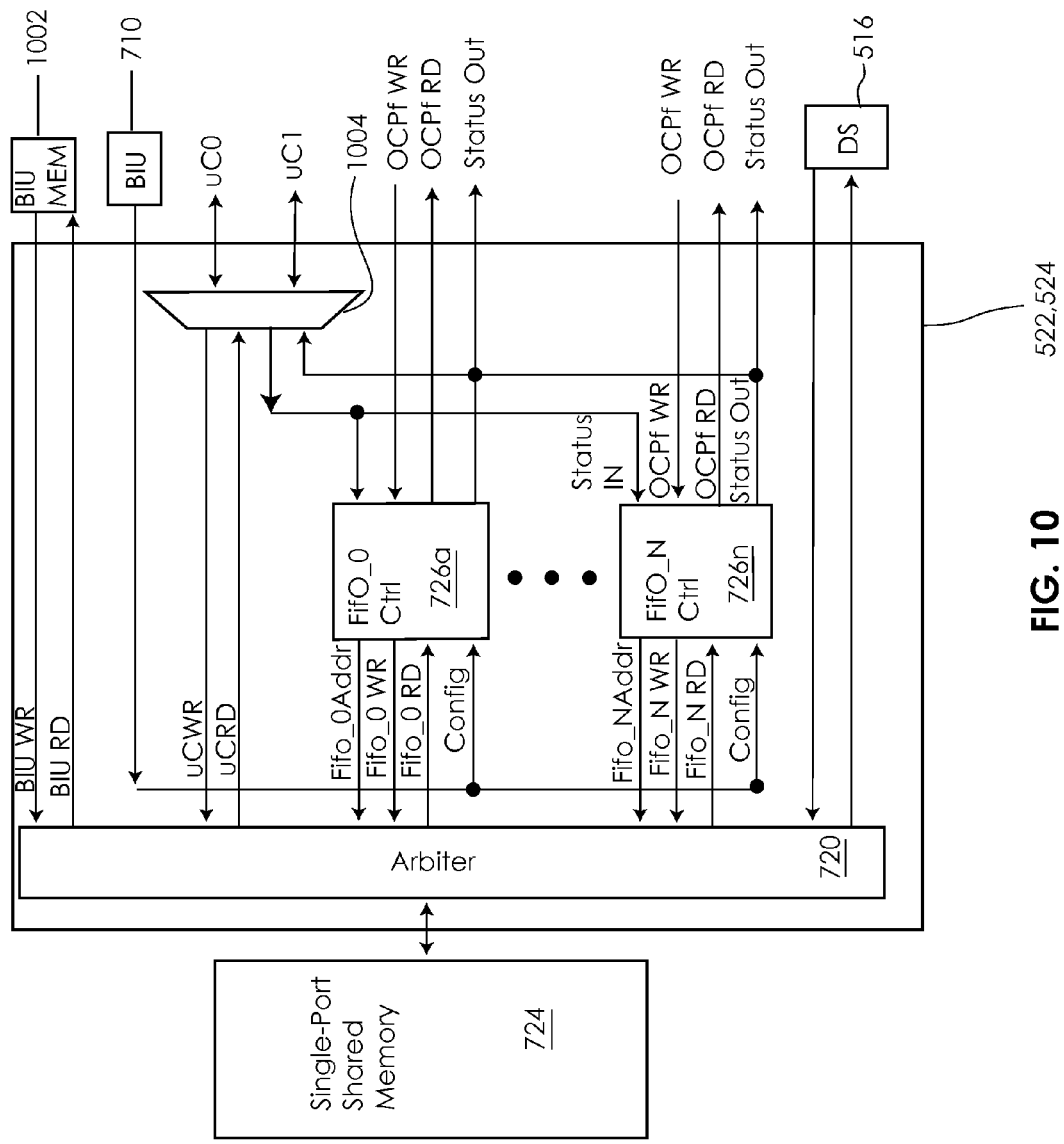
FIG. 10 is a block diagram showing more details of the hybrid buffer objects according to an embodiment of the present invention (compare with FIG. 7), including a BIU memory and a multiplexer.

FIG. 10 is a block diagram showing more details of the HBOs 522 and 524 according to an embodiment of the present invention (compare with FIG. 7), including a BIU memory 1002 and a multiplexer 1004. The interface to the BIU memory 1002 may be an h-IF interface. The interface to the data streamer 516 may be an x-IF interface.

More specifically, FIG. 10 shows N FIFO controllers 726a through 726n (two shown) and the corresponding signals. The BIU WR signal writes information from the BIU memory 1002 to the arbiter 720. The BIU RD signal reads information from the arbiter 720 to the BIU memory 1002. The Config signal allows the BIU 710 to configure the FIFO controllers 726.

Again, FIG. 10 shows there are three groups of interfaces: an interface to the BIU 710, four random access memory interfaces, and N sets of OCPf read/write interfaces for FIFO access.

There are 4 basic data transfer modes for each FIFO channel. The first is F2F, which stands for OCPf to OCPf data transfer. In this mode, the channel performs like a normal FIFO except that it uses the shared TCM memory (e.g., the DTCM 724) (data tightly coupled memory) as the data storage. The second is F2M, which stands for OCPf to memory interface. In this mode, the channel FIFO provides an OCPf write interface to a hardware agent, and a random memory access interface to a memory access agent (e.g., the micro-controller such as the F-Block0 510, the data streamer 516, or the BIU 710). The memory agent may update the FIFO read pointer through AHB backdoor (see FIG. 7) after data access. The third is M2F, which stands for memory to OCPf. In this mode, the channel FIFO provides an OCPf read interface for the hardware agent, and a random memory access interface to the memory agent (e.g., the micro-controller such as the F-Block0 510, the data streamer 516, or the BIU 71). The memory agent may update the FIFO write pointer through AHB backdoor (see FIG. 7) after data access. The fourth is M2M, which stands for memory to memory. In this mode, the channel FIFO provides random memory access interface for both sides. In this mode, each memory agent may update the read/write pointer separately.

The following parameters may be programmed through the AHB slave interface 701 for each FIFO: FIFO enable/disable; FIFO clear function; the programmable starting address of the FIFO space in the shared SRAM bank 724; and other control information, including programming FIFO depth, PUSH/POP, and level query.

Regular FIFO read/write operations by hardware modules may be performed through the OCPf interfaces 705. Each FIFO may have its own dedicated pair of OCPf interfaces (one read, one write); e.g., the interfaces OCPfWR and OCPfRD associated with the FIFO controller 726a. The FIFO channels act as the slave for all OCPf interfaces. According to an embodiment, read/write operations may be pushed back due to FIFO empty/full status or SRAM 724 access arbitration.

Up to two micro-controllers (e.g., F-Blocks 510 and 512) can be connected to each HBO 522 and 524 (see, e.g., FIG. 8). One of the micro-controller ports is designated the primary, and the other secondary; the primary port has higher priority over the secondary one. Both micro-controller ports provide random access to the shared SRAM 724.

A micro-controller (e.g., F-Blocks 510 or 512) can utilize a FIFO in one of the following two ways: as a memory, and as a queue. (These two methods are not mutually exclusive.)

The first way is as a random-access data memory (for storing local variables, for example). In this case, the micro-controller is oblivious to the FIFO configurations. Care should be taken to ensure that the micro-controller does not accidentally modify the data contents in the FIFO data queues.

The second way is as a message/data queue between the micro-controller and an external hardware module (such as DMA 220 or other hardware accelerators). For example, the micro-controller can act as the producer of control messages to an external accelerator (such as entropy decoder 514 or other variable length decoder); the information exchange is still of the sequential, FIFO nature. However, to reduce unnecessary data transfer, the micro-controller maintains its own write pointer, and saves the generated messages directly into the correct locations of the queue. After the message generation is done, the CPU 202 will update the write pointer inside the FIFO controller 726 to reflect the new status. In this mode, the unused OCPf interface will be disabled. To support this case, the micro-controller is able to read and write the address pointer of the message queue.

The arbiter 720 implements a three stage SRAM arbitration inside each HBO 522 and 524. A round-robin fashion arbiter is adopted in the first stage among all the OCPf agents for each bank. The winner of the first stage OCPf will do the round-robin arbitration with the x-interface (x-IF) request (to the data streamer 516). A fixed priority arbiter is used for the second stage; any access request from a higher priority level always supersedes requests from lower priority levels. These levels are as follows, from the highest one to the lowest: h-interface (h-IF) from the BIU 710; primary micro-controller; secondary micro-controller; and slow agent (the arbitration result between x-interface x-IF and OCPf interfaces).

A typical usage of the HBOs 522 and 524 is as follows. The HBOs 522 and 524 may be configured to operate in asynchronous mode, with portions controlled in the system clock domain, and other portions controlled in the TCM clock domain. Three banks of TCM memory are configured in the DTCM 724. Each TCM memory size is configured separately: bank 0 has three channels, bank 1 has two channels, and bank 2 has three channels. The micro-controllers (e.g., F-Blocks 510 and 512) are connected to memory interface 804 and 806 for TCM access, and operate in the TCM clock domain. The BIU memory interface 802 and the data streamer memory interface 808 are connect to h-interface h-IF and x-interface x-IF.

A group of hardware agents are connected to the HBOs 522 and 524 with OCPf interfaces (see FIG. 10).

For micro-controller interfaces, TCM access is just like a local SRAM except the arbitration, and the data will be ready the next cycle of grant. For all other agent access, the registered read data is used.

For each bank, a round-robin arbiter (e.g., the arbiter 720) is used for the FIFO channel arbitration. For each channel there are three possible requests: an OCPf read request, an OCPf write request, and a FIFO clear request. The clear request should not happen at the same time with a read request or write request. The FIFO clear request may originate from BIU module 710; the FIFO may be disabled before the clear request.

A channel status control signal may be used to generate all the statuses for each FIFO channel and to handle micro-controller backdoor push/pop/clear operation.

There are two set of pointers for each channel. One set is pending pointers which is updated by the first stage arbitration result and/or push/pop/clear operations. The other set is post updated pointers which is controlled by the [rspQ] and push/pop/clear operation. The pending pointers generated status is used to qualify the OCPf request signal for arbitration. The post updated pointers generated status (level) may be polled by the micro-controllers (e.g., the F-Blocks 510 and 512) through the BIU backdoor. The micro-controllers may do memory access and backdoor update the pointer (push/pop) based on the channel status.

According to an embodiment, each FIFO controller 726 is associated with a corresponding FIFO in the SRAM 724. According to an embodiment, each FIFO controller 726 is associated with a corresponding hardware device. According to an embodiment, each FIFO in the SRAM 724 is associated with a corresponding hardware device. According to an embodiment, a FIFO may be associated with more than one hardware device; for example, a first hardware device fills the FIFO with data, and a second hardware device extracts the data from the FIFO.

Figure 11:
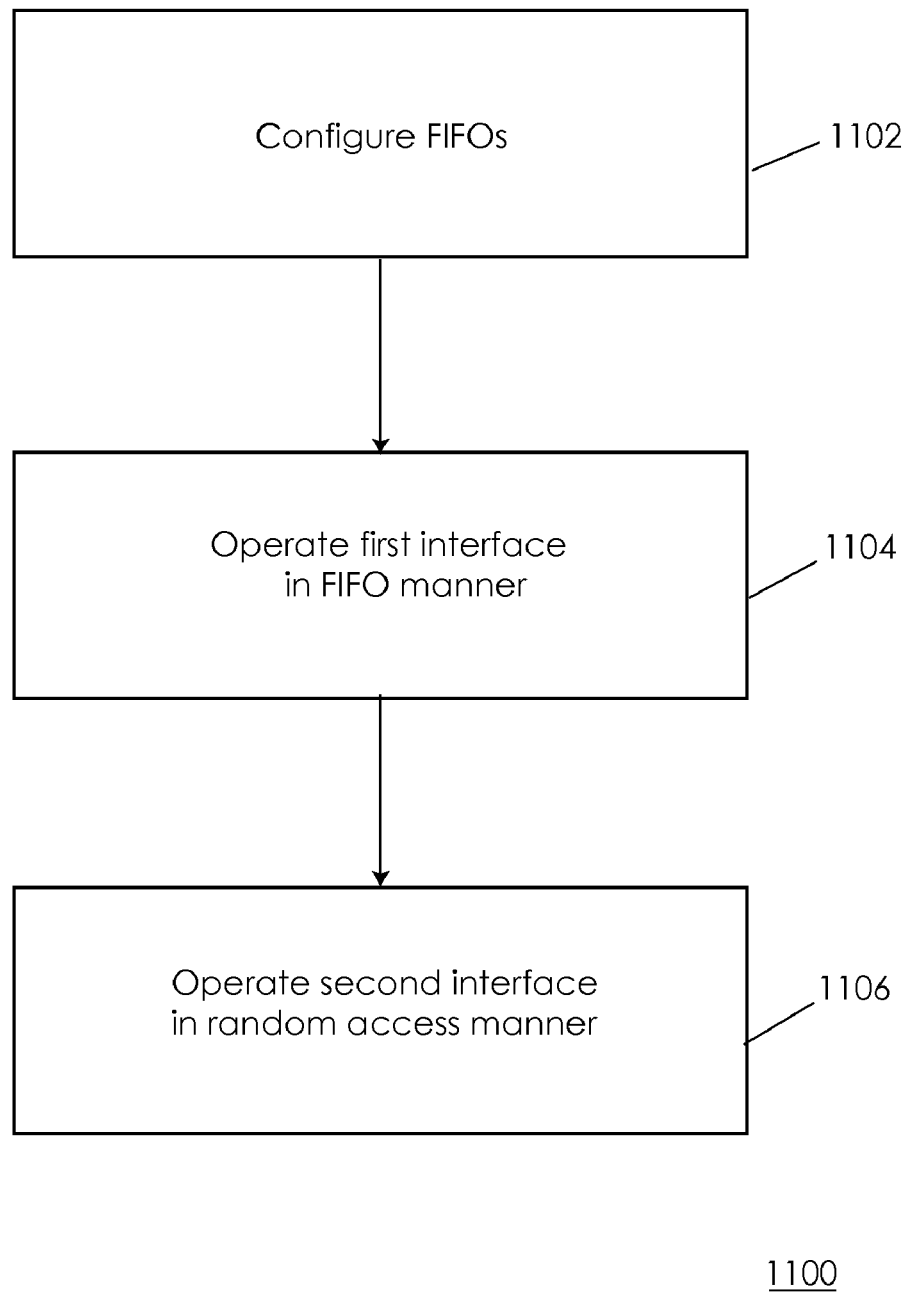
FIG. 11 is a flowchart for a method of operating a memory in a processing system according to an embodiment of the present invention.

FIG. 11 is a flowchart for a method 1100 of operating a memory in a processing system according to an embodiment of the present invention. The memory includes a first interface and a second interface (e.g., in FIG. 8, the HBOs 522 and 524 include the FIFO interface 705 and the interface 804, among others).

At 1102, a number of FIFOs are configured in the memory. For example, in FIG. 8, the SRAM 724 is configured to implement a number of FIFOs that are controlled by the FIFO controller 726.

At 1104, the first interface is operated, in a FIFO manner, between the memory and a number of storage devices. For example, in FIG. 8, the FIFO interface 705 operates to transfer data in a FIFO manner between the SRAM 724 and a number of hardware modules 705.

At 1106, the second interface is operated, in a random access manner, between the memory and a processor. For example, in FIG. 8, the interface 804 operates to transfer data in a random access manner between the SRAM 724 and the F-Block[0] 510.

Aspect 2: HBO FIFO

According to an embodiment, an HBO (e.g., the HBOs 522 and 524) may be configured to have multi-Bank and multi-Channel FIFOs. Each FIFO channel includes registers to specify the FIFO properties like FIFO depth and start address in the shared memory (e.g., the SRAM 724). These properties of the register configuration may be considered to be static, since there may be limitations for the CPU 202 to configure these registers on-the-fly. To address this issue, a buffer descriptor link list based HBO FIFO is introduced. The buffer descriptor link list based HBO FIFO puts the FIFO properties inside one dedicated FIFO in a defined format. (This dedicated FIFO may also be one of the HBO FIFOs.) Then, a piece of the hardware block reads the FIFO properties and programs the registers accordingly to realize on-the-fly changes of the FIFO properties. The buffer descriptor link list based HBO FIFO then helps the other HBO FIFOs do scattered memory access, which is often useful in data processing.

More specifically, and with reference to FIG. 10, a FIFO need not be contiguous in the SRAM 724. For example, the FIFO_N controller 726n may control a FIFO in the SRAM by storing a linked list of the memory locations that make up the FIFO. For example, the linked list may include linked pairs of data {base address, size} that make up the FIFO. These linked pairs of data may also be referred to as data descriptors. The FIFO_N controller 726n then manages these data descriptors.

In addition, the FIFO_0 controller 726a may control a dedicated FIFO that stores the buffer descriptor link list. The HBOs 522 and 524 then use the FIFO_0 controller 726a to access the buffer descriptor link list in order to configure the other FIFO controllers 726. The CPU 202 may perform the initial configuration of the buffer descriptor link list and the FIFO_0 controller 726a. Then to change the configuration of a particular FIFO controller 726, the CPU 202 does not need to configure that FIFO controller 726 directly, but merely needs to reconfigure the buffer descriptor link list via the FIFO_0 controller 726a.

Furthermore, once the FIFO controllers 726 are each programmed with their corresponding linked lists that define their FIFOs, the FIFO controllers 726 may operate without intervention by the CPU 202. The FIFO controllers 726 just recycle the defined data descriptors according to their linked lists.

In addition, a particular hardware device may be easily associated with two FIFOs successively. For example, assume that the hardware device is associated with FIFO_N controller 726n and is consuming data from the associated FIFO ("the first FIFO"). During that time, the CPU 202 is filling another FIFO ("the second FIFO") with data. Then once the first FIFO has been consumed (and the second FIFO has been filled), the CPU 202 reprograms the FIFO_N controller 726n with a linked list that points to the second FIFO. Then the hardware device consumes the second FIFO.

Aspect 3: DMA Prefetch

For a device such as the video processor 106, the initialization/configuration or context switching stage may consume a lot of host controller computing power since there are a lot of registers or SRAM to be programmed. To relieve the host controller, the video processor 106 uses the DMA engine (DMA circuit) 220 with a small porter module in the video processor 106 to fetch the programming sequence (in the format of {address, data} pairs), which is prepared beforehand by the host controller in the DRAM 104, to the destinations (registers or SRAM) in the video processor 106. In this manner, instead of writing the all the configurations through the register bus, the host controller updates a part of the configuration data in the DRAM 104 (in the format of {address, data} pairs or {start address, data count, data, . . . }), and then initiates the DMA command.

Figure 12:
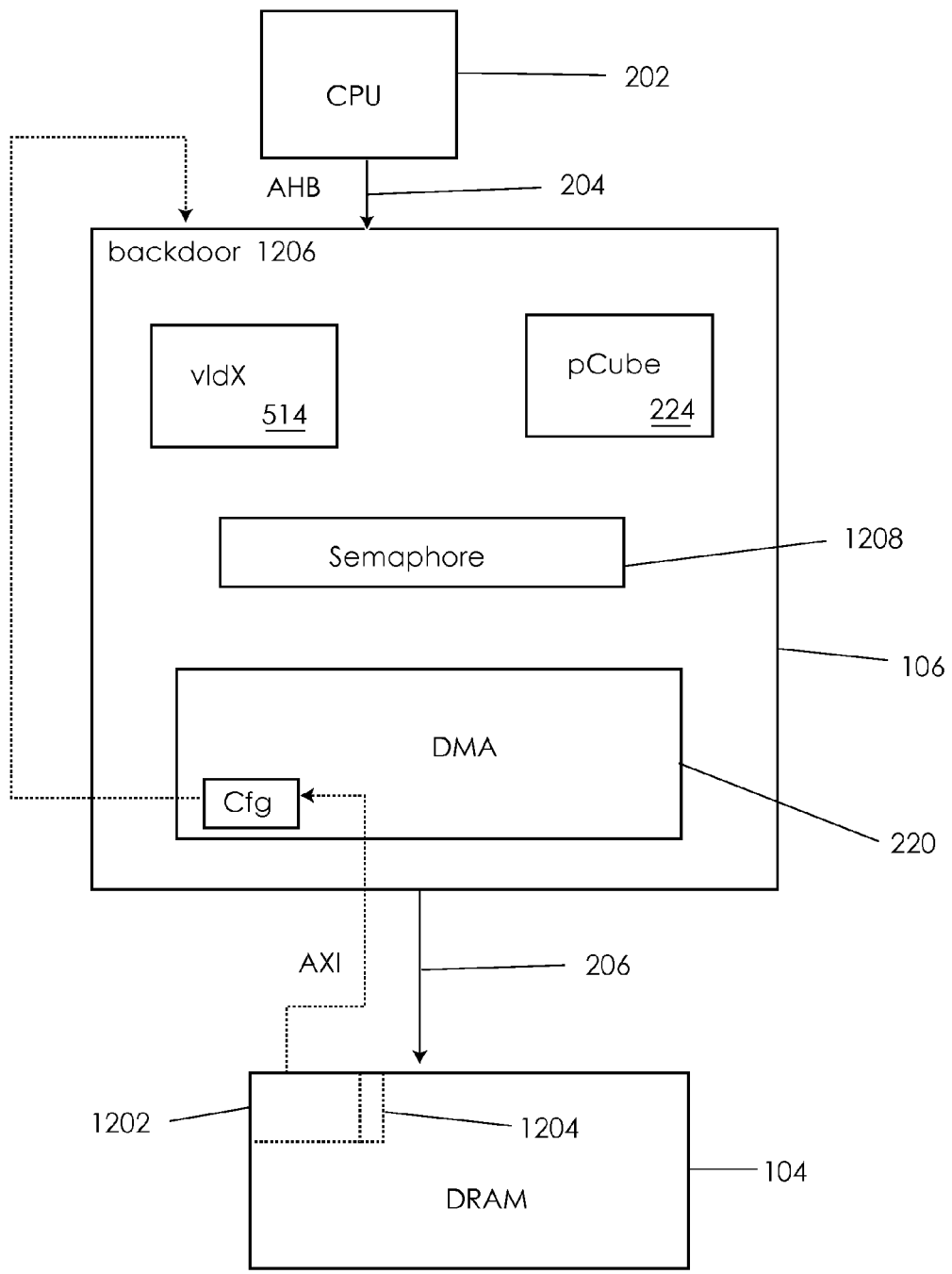
FIG. 12 is a block diagram showing a DMA prefetch aspect of the video processing system according to an embodiment of the present invention.

FIG. 12 is a block diagram showing a DMA prefetch aspect of the video processing system 100 according to an embodiment of the present invention. Note that many of the components are described in other figures (e.g., FIG. 7) and that FIG. 12 is simplified to more clearly explain the DMA prefetch aspect. Noteworthy features are configuration data 1202 including a semaphore 1204, a backdoor 1206 and a semaphore controller 1208.

In general, FIG. 12 shows that the DRAM 104 may be used as a double buffer to improve the operation of the video processing system 100. More specifically, when the video processor 106 is processing the current data using the current configuration data, the CPU 202 is processing the next configuration data. The process uses the semaphore 1204 (the last part of the configuration data 1202) to keep the CPU 202 and the DMA 220 in sync.

A general description of the DMA prefetch process is as follows. (As an initial state, assume that the video processor 106 is already processing a first data unit using first configuration data that includes a first semaphore, which is stored by the semaphore controller 1208.)

First, the CPU 202 prepares the second (next) configuration data. This preparation may occur while the video processor 106 is processing the first data unit. The CPU 202 provides the second configuration data to the DRAM 104 over the AHB bus 202, which is generally a slow bus (e.g., 15 MHz). (Note in FIG. 7 the path from the CPU 202 to the AHB XBAR 204 to the AXI XBAR 206 to the DRAM 104.)

Second, the video processor 106 finishes processing the first data unit. This processing may be performed at a high rate, e.g., 300 MHz, since the AXI bus 206 is a high speed bus.

The semaphore controller 1208 uses the first semaphore to signal the CPU 202 that the video processor 106 has finished processing the first data unit. (The CPU 202 should receive this semaphore prior to the CPU 202 instructing the video processor 106 to process the second data unit, as described "fifth" below.)

Third, the DMA 220 reads the second configuration data (e.g., 1202) including the second semaphore (e.g., 1204) from the DRAM 104, and provides the second configuration data to the backdoor 1206 of the video processor 106 via the AHB master (not shown). The DMA 220 may have a dedicated channel for providing the configuration data 1202.

Fourth, the video processor 106 configures its various processing modules, such as the entropy decoder 514 and the pixel processor 224, using the second configuration data. The semaphore controller 1208 updates to the second semaphore and informs the CPU 202.

Fifth, the CPU 202 instructs the video processor 106 to processes the second data unit (using the processing modules) at a high rate (e.g., 300 MHz).

The process then repeats as necessary. As can be seen from the above description, the slow bus (e.g., the AHB bus 202) is not a bottleneck, because preparing the next configuration data may occur while the current data unit is being processed.

The configuration data may be in two types. The first type is regular data. This may be in the format of 64 bit units (32 bits of address information and 32 bits of data). The second type is lookup table data. The lookup table data may correspond to a set of instructions (e.g., a computer program) that controls the operation of the processing modules (e.g., the entropy decoder 514 and the pixel processor 224). The lookup table data may be in 32 bit units, each including a 32 bit start address, a 32 bit data count, and a number of 32 bit instructions or data.

Aspect 4: Bus Gatekeeper

In general, a bus gatekeeper according to an embodiment helps to manage the reset process of devices that are connected by a bus. More specifically, one feature is that the reset of a particular device does not cause any other bus slaves in the system to enter an invalid state because of incomplete transactions on the bus.

A brief summary of the operation of the bus gatekeeper is as follows. During normal operations, the gatekeeper monitors the bus transactions. A new transaction request is recorded by pushing the transaction descriptor into a monitor queue. After the corresponding data transfers are completed, the transaction descriptor will be popped from the monitor queue. During the software reset stage, the gatekeeper takes over the bus master interface by blocking all the new incoming commands from the block, and by finishing the incomplete transactions that are recorded in the gatekeeper monitor queue. After the monitor queue is empty, the gatekeeper will set the reset complete flag to high to inform the host software that the reset process is complete.

Figure 13:
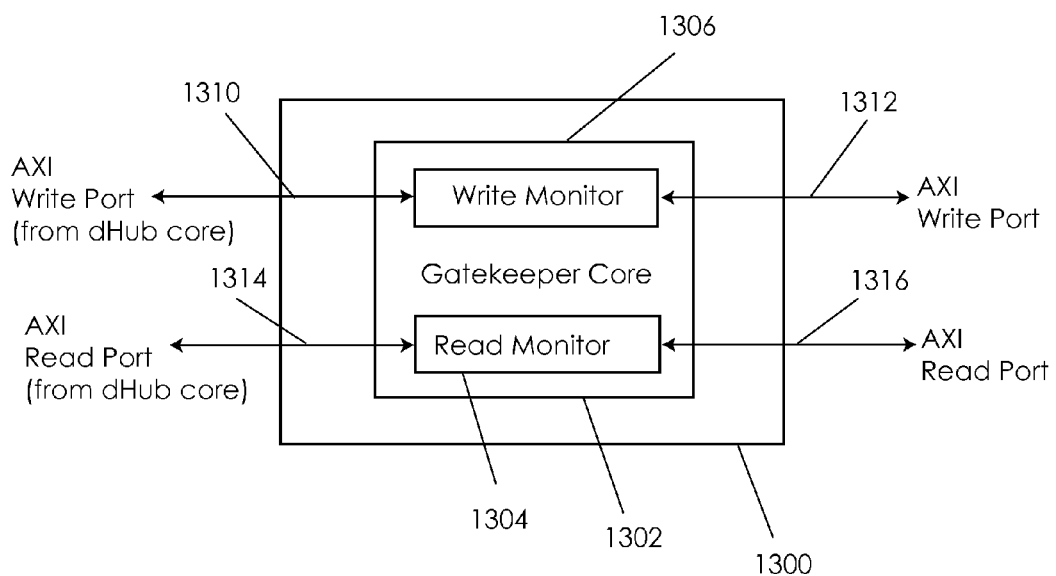
FIG. 13 is a block diagram of a bus gatekeeper according to an embodiment of the present invention.

FIG. 13 is a block diagram of a bus gatekeeper 1300 according to an embodiment of the present invention. The bus gatekeeper 1300 includes a gatekeeper core 1302, which includes a read monitor queue 1304 and a write monitor queue 1306. The bus gatekeeper 1300 sits between the DMA circuit 220 and the AXI bus 206 (see FIG. 2). The write monitor queue 1306 connects through a write port interface 1310 to the DMA circuit 220 and through a write port interface 1312 to the AXI bus 206. The read monitor queue 1304 connects through a read port interface 1314 to the DMA circuit 220 and through a read port interface 1316 to the AXI bus 206.

In general, the bus gatekeeper 1300 takes over the DMA circuit 220 AXI master interfaces during reset in order to make sure the AXI bus 206 is clean before allowing reset of the DMA circuit 220. During normal DMA circuit 220 operations, the gatekeeper 1300 monitors the AXI commands from the DMA circuit 220. After receiving a new command, the command is pushed into one of the monitor queues 1304 (for a read command) or 1306 (for a write command). After the corresponding data transfers are completed, the command is popped from the monitor queue. The monitor queue depth is the RTL parameter of the gatekeeper 1300. During reset stage, the gatekeeper 1300 blocks all the new incoming commands from the DMA circuit 220, and continues processing the not completed commands which are stored in the gatekeeper monitor queues 1304 and 1306. After the monitor queues 1304 and 1306 are empty, the gatekeeper 1300 sets a reset complete flag to high.

More specifically, the operation of the bus gatekeeper 1300 during a read is as follows. First, the master tells the gatekeeper 1300 (via the command) how much data it is requesting. Additional incoming read commands are stored in the read monitor queue 1304. Second, the gatekeeper core 1302 keeps track of the data received from the slave. Third, the gatekeeper core 1302 does not allow a reset until all the data is received from the slave. Fourth, when the gatekeeper 1300 receives a reset, it stops sending requests (e.g., read commands) to the slave.

The operation of the bus gatekeeper 1300 during a write is as follows. First, the gatekeeper core 1302 waits for a write command before sending data to the slave. Second, on reset, the gatekeeper 1300 blocks new write commands from the master. Third, the gatekeeper 1300 waits until the slave has finished writing before allowing the reset.

Although the above description has focused on a video processing implementation, an embodiment of the present invention is not so limited. One or more aspects of the present invention may be implemented in other processing environments.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An apparatus comprising:
    a first interface located between a random access memory and a hardware device, wherein the first interface operates in a first in first out (FIFO) manner to write data from the hardware device in the FIFO manner to the random access memory, and read data from the random access memory to the hardware device in the FIFO manner; and
    a second interface located between the random access memory and a processor, wherein the second interface operates in a random access manner to read data in the random access manner from the random access memory and provide the data to the processor, and write data from the processor in the random access manner to the random access memory.

2. The apparatus of claim 1, wherein the random access memory includes a static random access memory configured as a data tightly coupled memory.

3. The apparatus of claim 1, further comprising:
    a FIFO controller configured to control access to the random access memory.

4. The apparatus of claim 1, wherein the random access memory has a configurable size and a configurable base address.

5. The apparatus of claim 1, wherein the random access memory is configurable by a bus interface unit module through the second interface.

6. The apparatus of claim 1, wherein the random access memory comprises a first in first out memory.

7. The apparatus of claim 1, further comprising:
    an arbiter circuit coupled between a FIFO controller and the random access memory and configured to arbitrate access to the random access memory.

8. The apparatus of claim 1, wherein the second interface is one of a plurality of second interfaces, and wherein the plurality of second interfaces includes:
    a bus interface unit interface, that operates in the random access manner, between the random access memory and a bus interface unit module.

9. The apparatus of claim 1, wherein the second interface is one of a plurality of second interfaces, and wherein the plurality of second interfaces includes:
    a bus interface unit interface, that operates in the random access manner, between the random access memory and a bus interface unit module, wherein the random access memory is configurable by the bus interface unit module.

10. The apparatus of claim 1, wherein the second interface is one of a plurality of second interfaces, and wherein the plurality of second interfaces includes:
    a first processor interface, that operates in the random access manner, between the random access memory and a first processor; and
    a second processor interface, that operates in the random access manner, between the random access memory and a second processor aim 1, wherein the second interface is one of a plurality of second interfaces, and wherein the plurality of second interfaces includes:
    a data streamer interface, that operates in the random access manner, between the random access memory and a data streamer.

11. The apparatus of claim 1, wherein the hardware device comprises a storage device.

12. A method comprising:
    operating, in a FIFO manner, a first interface between a random access memory and a hardware device, wherein operating in the FIFO manner comprises:
    reading data from the hardware device and providing the data to the random access memory in the FIFO manner; and
    writing data from the random access memory to the hardware device in the FIFO manner; and
    operating, in a random access manner, the second interface between the random access memory and a processor, wherein operating in the random access manner comprises:
    reading data in the random access manner from the random access memory and providing the data to the processor; and
    receiving data from the processor in the random access manner and storing the data in the random access memory.

13. The method of claim 12, wherein the random access memory includes a static random access memory configured as a data tightly coupled memory.

14. The method of claim 12, further comprising controlling access to the random access memory using a FIFO controller.

15. The method of claim 12, wherein the random access memory has a configurable size and a configurable base address.

16. The method of claim 12, further comprising configuring the random access memory using a bus interface unit module through the second interface.

17. The method of claim 12, wherein the random access memory comprises a first in first out memory.

18. The method of claim 12, further comprising arbitrating access to the random access memory using an arbiter circuit coupled between a FIFO controller and the random access memory.

19. The method of claim 12, further comprising operating a bus interface unit interface located between the random access memory and a bus interface unit module in the random access manner.

20. The method of claim 12, further comprising configuring the random access memory in the random access memory by a bus interface unit module that operates in the random access manner and is located between the random access memory and a bus interface unit module.

* * * * *